(12) United States Patent
Ishii et al.

(10) Patent No.: US 7,689,078 B2
(45) Date of Patent: Mar. 30, 2010

(54) OPTICAL DEVICE

(75) Inventors: Akira Ishii, Kawasaki (JP); Takehito Tanaka, Kawasaki (JP); Masaharu Doi, Kawasaki (JP); Tetsu Hasegawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/035,720

(22) Filed: Feb. 22, 2008

(65) Prior Publication Data

US 2009/0003756 A1 Jan. 1, 2009

Related U.S. Application Data

(62) Division of application No. 11/775,917, filed on Jul. 11, 2007, now Pat. No. 7,526,161.

(30) Foreign Application Priority Data

Jul. 19, 2006 (JP) ............................. 2006-197243
Jan. 19, 2007 (JP) ............................. 2007-010847

(51) Int. Cl.
  *G02B 6/42* (2006.01)
  *G02F 1/035* (2006.01)
(52) U.S. Cl. ................. 385/48; 385/40; 385/2
(58) Field of Classification Search .......... 385/48, 385/40, 2
See application file for complete search history.

(56) References Cited

U.S. PATENT DOCUMENTS

| | | | |
|---|---|---|---|
| 5,289,551 A | | 2/1994 | Nakama et al. |
| 5,526,448 A | * | 6/1996 | Nagata et al. ................. 385/1 |
| 5,907,426 A | * | 5/1999 | Kato et al. ................. 359/239 |
| 6,522,794 B1 | * | 2/2003 | Bischel et al. ................. 385/4 |
| 6,668,103 B2 | * | 12/2003 | Hosoi ............................. 385/2 |
| 7,043,134 B2 | * | 5/2006 | Berini et al. ................. 385/147 |
| 7,079,732 B2 | * | 7/2006 | Maruyama et al. ............ 385/48 |
| 7,200,289 B2 | * | 4/2007 | Yamada et al. ................. 385/3 |
| 7,212,326 B2 | * | 5/2007 | Wooten et ................. 359/245 |
| 7,359,581 B2 | * | 4/2008 | Miyazaki et al. ............... 385/3 |
| 7,526,161 B2 | | 4/2009 | Ishii et al. |

(Continued)

FOREIGN PATENT DOCUMENTS

EP     1 186 936     3/2002

(Continued)

OTHER PUBLICATIONS

U.S. Appl. No. 11/775,917, filed Jul. 11, 2007, Akira Ishii, et al., Fujitsu Limited.

(Continued)

*Primary Examiner*—K. Cyrus Kianni
(74) *Attorney, Agent, or Firm*—Staas & Halsey LLP

(57) ABSTRACT

An optical device including (a) a substrate having an electro-optic effect; (b) a modulating optical waveguide formed on a surface layer portion of said substrate and forming an interference optical modulator for modulating input light; (c) an output optical waveguide formed on said surface layer portion of said substrate and connected to a downstream side portion of said modulating optical waveguide; and (d) a branching monitoring section for monitoring branched light of light propagated along said output optical waveguide and emitted from an outgoing end face of said substrate. The output waveguide has a reduced width region in which the waveguide width is reduced.

7 Claims, 22 Drawing Sheets

U.S. PATENT DOCUMENTS

| | | | |
|---|---|---|---|
| 7,551,820 B2 | 6/2009 | Ishii et al. | |
| 2001/0009594 A1* | 7/2001 | Hosoi | 385/2 |
| 2002/0031304 A1 | 3/2002 | Roberts et al. | |
| 2002/0122615 A1* | 9/2002 | Painter et al. | 385/15 |
| 2003/0118279 A1 | 6/2003 | Izhaki et al. | |
| 2004/0101248 A1* | 5/2004 | Tavlykaev et al. | 385/48 |
| 2004/0165246 A1* | 8/2004 | Carlson et al. | 359/245 |
| 2004/0240765 A1* | 12/2004 | Wooten et al. | 385/2 |
| 2005/0135721 A1* | 6/2005 | Painter et al. | 385/1 |
| 2005/0254743 A1* | 11/2005 | Akiyama et al. | 385/3 |
| 2005/0265663 A1* | 12/2005 | Maruyama et al. | 385/47 |
| 2006/0051011 A1* | 3/2006 | Ohmori et al. | 385/14 |
| 2006/0056002 A1* | 3/2006 | Wooten et al. | 359/245 |
| 2007/0002924 A1* | 1/2007 | Hutchinson et al. | 372/98 |
| 2007/0076999 A1* | 4/2007 | Miyazaki et al. | 385/8 |
| 2008/0044128 A1* | 2/2008 | Kish et al. | 385/14 |
| 2009/0003756 A1* | 1/2009 | Ishii et al. | 385/3 |

FOREIGN PATENT DOCUMENTS

| | | |
|---|---|---|
| EP | 1 335 242 | 8/2003 |
| JP | 4-172308 | 6/1992 |
| JP | 11-52158 | 2/1999 |
| JP | 2003-270468 | 9/2003 |
| JP | 2006-91785 | 4/2006 |

OTHER PUBLICATIONS

European Search Report dated Nov. 12, 2007 for corresponding European Patent Application No. 07014013.2-2216.
U.S. Appl. No. 12/035,692, filed Feb. 22, 2008, Akira Ishii, et al., Fujitsu Limited.
Office Action mailed Jan. 30, 2008 in U.S. Appl. No. 11/775,917.
Office Action mailed Jun. 18, 2008 in U.S. Appl. No. 11/755,917.
Notice of Allowance and Fee(s) Due mailed Jan. 28, 2009 in U.S. Appl. No. 11/755,917.
Issue Notification mailed Apr. 8, 2009 in U.S. Appl. No. 11/755,917.
Office Action mailed Sep. 11, 2008 in U.S. Appl. No. 12/035,692.
Notice of Allowance and Fee(s) Due mailed Apr. 3, 2009 in U.S. Appl. No. 12/035,692.
Issue Notification mailed Jun. 3, 2009 in U.S. Appl. No. 12/035,692.

* cited by examiner

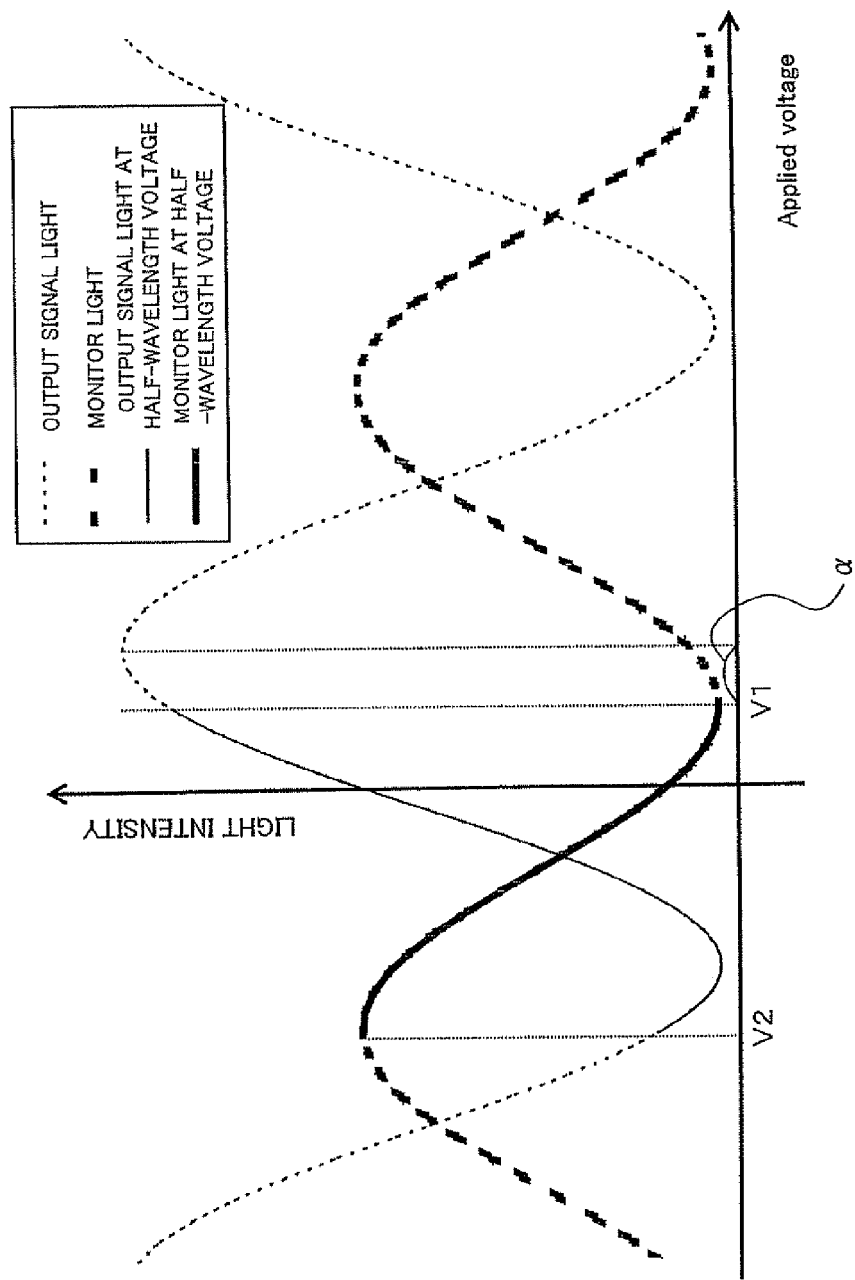

OPTICAL DEVICE

This application is a divisional of Ser. No. 11/775,917 filed Jul. 11, 2007 now U.S. Pat. No. 7,526,161, the disclosure of which is incorporated herein by reference.

BACKGROUND OF THE INVENTION

1) Field of the Invention

The present invention relates to an optical device suitable for use with a case wherein monitoring light for monitoring optical modulation operation is fetched.

2) Description of the Related Art

In recent years, an optical modulator configuring an optical device has been applied to and used in a high-speed long-haul optical communication transmission apparatus. The optical modulator performs optical modulation by applying a modulation signal voltage to an optical waveguide formed on a substrate. As one of optical waveguides for optical modulation, a Mach-Zehnder (hereinafter referred to simply as MZ) type optical waveguide is known.

In the optical modulator as an optical device to which the MZ type optical waveguide is applied, a traveling wave electrode (electric waveguide) for controlling the relative phase of lights propagated along each of arm waveguides which form the MZ type optical waveguide is formed. In particular, a modulation signal voltage is applied to each traveling wave electrode to control the refraction index of the arm thereby to vary the optical path length difference between the two arms to achieve optical modulation.

It is to be noted that, in order to use a modulator having such a configuration as described above to obtain a suitable optical modulation signal, application of an RF modulation signal having a suitable voltage to the arm waveguides and application (operation point control) of a suitable DC bias voltage for controlling the relative phase shift amount between the two arm waveguides are demanded. Particularly, in order to suitably perform the latter operation point control, it is necessary to accurately monitor the optical output signal.

To this end, generally a function for monitoring the optical output signal is integrated in the optical modulator. However, two kinds of methods are generally available as a method for monitoring such suitable output signal light as described above. One of the methods is a technique (a) wherein modulated output signal light (main signal) itself is monitored, and the other one of the methods is a technique (b) wherein output signal light is monitored indirectly, not from the main signal itself but from light which has some correlation to the main signal.

As the former technique, three methods are available; a method (a-i) wherein a tap is provided for the optical waveguide to branch and monitor the main signal, another method (a-ii) wherein a half mirror or the like is arranged for the main signal after outputted from an optical substrate to branch and monitor the main signal, and a further method (a-iii) wherein leakage light from the main signal waveguide is picked up.

As the latter technique two methods are available; a method (b-i) wherein light which leaks into the substrate when phase-modulated light of the arms of the MZ optical waveguide are coupled is monitored, and another method (b-ii) wherein a portion for coupling phase-modulated light of the arms of the MZ optical waveguide is formed from an MMI (Multi-Mode Interferometer) or the like and performs switching operation such that an output on one side is used as monitor light. In short, according to the technique, two light fluxes having substantially reverse phases to each other are switched by the MMI or the like so as to be outputted alternately through the two waveguides, and one of the light fluxes is fetched as output signal light while the other one of the light fluxes is fetched as monitor light.

In the former technique, it is a prerequisite that the phase difference $\theta=0+\alpha$ between the main signal and the monitor light is substantially 0 (that is, $\alpha\to 0$) in order that the operation for applying a suitable DC bias voltage functions. Meanwhile, in the latter technique, it is a prerequisite that the main signal light (output signal light) and the monitor light have reverse phases to each other and the phase difference $\theta=\pi+\alpha$ between the main signal and the monitor light is substantially $\pi$ (that is, $\alpha\to 0$), for example, as seen in FIG. 4 in order that the operation for applying a suitable DC bias voltage functions. In other words, a modulation state of the main signal light can be monitored accurately from the monitor light under such a phase relationship as described above.

As an example, FIG. 5 is a view showing an example of a configuration of an optical modulator 100 as an optical device to which the method (b-ii) described hereinabove is applied. The optical modulator 100 shown in FIG. 5 includes a substrate 191 on which an MZ type optical waveguide 110 and an electrode 111 are formed, a light reception section 121 for receiving monitor light, a modulation electric signal generation section 123 for generating an electric signal in accordance with modulation data to be supplied to the electrode 111, a bias voltage generation section 124 for generating an operation point voltage regarding a modulation electric signal to be supplied to the electrode 11, and a control section 125 for controlling the operation point voltage to be generated by the bias voltage generation section 124 in response to the monitor light received by the light reception section 121.

The MZ type optical waveguide 110 includes an input waveguide 101 for receiving input light, an MMI 102 connected to the input waveguide 101, two arm waveguides 103 branched at the MMI 102, another MMI 104 connected to the two arm waveguides 103, and an output optical waveguide 105 and a monitoring optical waveguide 106 further branched at and connected to the MMI 104 after the two arm waveguides 103 are coupled at the MMI 104.

Output signal light propagated along the output optical waveguide 105 is outputted from a face opposite to that of the substrate 191 to the input light is inputted. Further, a reflection groove 113 is formed at the downstream side end of the monitoring optical waveguide 106, and light reflected on the reflection groove 113 is outputted from a side face of the substrate 191 different from the end face from which the output signal light is outputted. In particular, the light reception section 121 is formed on the side face side of the substrate 191 and receives the light propagated through the monitoring optical waveguide 106 and reflected by the reflection groove 113 as monitor light.

Consequently, in the optical modulator 100 shown in FIG. 5, which is applied for example an NRZ (Non Return to Zero) modulation scheme, a voltage V1-V2 in FIG. 4 can be regarded a half-wavelength voltage $V\pi$. Then, the control section 125 feedback controls a bias voltage V3 based on the value of the monitor light (refer to reference character B in FIG. 4) from the light reception section 121 such that a voltage V1 is applied to the electrode 111 when the optical output signal has the high level but another voltage V2 is applied to the electrode 111 when the optical output signal has the low level.

As a modulation method of an optical signal, various methods such as duo binary, DPSK (Differential Phase Shift Keying) and DQPSK (Differential Quadrature Phase Shift Keying) methods are available in addition to the NRZ method described above. However, in all methods, a photodiode having a comparatively large light reception diameter is disposed as the light reception section 121 at the substantially center of a monitor light beam so that the monitor light is received. Consequently, the light amount which can be received by the light reception section 121 is secured and the allowance of the mounting position of the photodiode with reference to the light reception amount by the photodiode is moderated.

In particular, while the output signal light is light formed by picking up only light within a reduced area at the center of the waveguide using an optical fiber not shown connected to the outgoing end face of the substrate 191, the monitor light is received over a wide area by the light reception section 121.

FIG. 20 is a view showing an example of a configuration of an optical modulator 200 as an optical device to which the method (a-ii) described above wherein the main signal is branched and monitored using a half mirror or the like arranged for the signal light after it is outputted from an optical substrate is applied as a method for monitoring output signal light.

In the optical modulator 200 shown in FIG. 20, an MZ type optical waveguide 210 from which the monitoring optical waveguide 106 shown in FIG. 5 is omitted is formed on a substrate 191. In particular, the MZ type optical waveguide 210 includes an input waveguide 101 for receiving input light, an MMI 102 connected to the input waveguide 101 for branching the input waveguide 101, two arm waveguides 103 branched at the MMI 102, another MMI 104 connected to the two arm waveguides 103 for coupling the two arm waveguides 103, and an output optical waveguide 105 connected to the MMI 104 after the two arm waveguides 103 are coupled by the MMI 104.

The optical modulator 200 further includes a half mirror 231 for branching part of light propagated along the output optical waveguide 105 and outputted from an outgoing end face 210a of the substrate 191. The optical modulator 200 further includes an electrode 111, a light reception section 121, a modulation electric signal generation section 123, a bias voltage generation section 124 and a control section 125 similar to those of the optical modulator 100 shown in FIG. 5. It is to be noted that a voltage signal generation section 122 for generating a voltage signal for the electrode 111 is formed from the modulation electric signal generation section 123 and the bias voltage generation section 124. In FIG. 20, the light reception section 121 is disposed so as to receive one of light fluxes branched by the half mirror 231, and the other one of the light fluxes branched by the half mirror 231 is coupled with an optical fiber through a lens or the like not shown.

Consequently, since, in the optical modulator 200 shown in FIG. 20, light corresponding to the output signal light is fetched as the monitor light by the light reception section 121, similarly as in the optical modulator 100 shown in FIG. 5, the control section 125 performs feedback control of the bias voltage of the bias voltage generation section 124 based on the value of the monitor light from the light reception section 121. It is to be noted that, in the optical modulator 200 shown in FIG. 20, the half mirror 231 is applied in order to fetch the monitor light by means of the light reception section 121. Therefore, in the optical modulator 200, it can be supposed to be more important than in the optical modulator 100 shown in FIG. 5 to apply a photodiode having a comparatively large light reception diameter as the light reception section 121 in order to secure the light reception amount.

It is to be noted that techniques relating to the present invention are disclosed, for example, in the following Patent Documents 1 to 3.

[Patent Document 1] Japanese Patent Laid Open No. 2003-270468

[Patent Document 2] Japanese Patent Laid-Open No. HEI 11-52158

[Patent Document 3] Japanese Patent Laid-Open No. 2006-91785

However, while, in the operation point control of such an optical modulator 100 as described above with reference to FIG. 5 to which an optical device is applied, $\alpha$ in the deviation $\pi+\alpha$ in phase difference between the output signal light and the monitor light preferably is substantially zero, for example, as indicated by reference character a in FIG. 6, the value $\alpha$ does not fully become zero. The phase deviation $\alpha$ is called bias shift (bias shift is hereinafter referred to sometimes simply as BS). It is to be noted that FIG. 6 is a view illustrating the bias shift $\alpha$ where the monitor light is fetched using the method (b-ii) described hereinabove.

While the output signal light and the monitor light are propagated along and outputted from the output optical waveguide 105 and the monitoring optical waveguide 106, respectively, phase variation arises from mixing between 0th-order mode light and first-order mode light in the process of the light propagation in the waveguides 105 and 106. The deviation in phase variation which appears with light propagated along the output optical waveguide 105 and the monitoring optical waveguide 106 makes a cause of generation of the bias shift described above.

Further, if the amount of the bias shift described above increases, then the transmission quality of light degrades. In particular, the variation of the monitor signal to be utilized as a reference in the feedback control of the bias voltage is displaced from the variation of the output signal light. Therefore, the output signal light is controlled at a bias point deviated from an optimum point of the feedback control.

Since, in the case of the NRZ modulation method described above, the bit rate of the modulation signal handled is comparatively low, and the influence of the bias shift on the transmission quality is comparatively small. However, in such modulation methods as the duo binary, DPSK, DQPSK methods and so forth developed together with increase of the bit rate of modulation data in recent years, it is supposed that, even if the amount of the bias shift is very small, the influence thereof on the transmission quality increases.

FIGS. 7($a$) to 7($d$) are views illustrating, as an example, phase variation of monitor light which causes appearance of the bias shift $\alpha$ in the optical modulator 100 described above with reference to FIG. 5.

Components of 0th-order mode light and first-order mode light are included dominantly in the monitor light outputted from the side face of the substrate 191 after reflection by the reflection groove 113 and received by the light reception section 121. If the position of the outgoing end face at which the light reflected by the reflection groove 113 is outputted from the substrate 191 is placed at an X-coordinate, then the monitor light has field intensity distributions of the 0th-order mode light and the first-order mode light indicated by reference characters A1 and A2 in FIG. 7($a$), respectively. Further, while, as indicated by reference character B1 in FIG. 7($b$), a bias shift component described above is not included in the 0th-order mode light, as indicated by reference character B2, a fixed phase variation amount component which does not rely upon the end face position is included in the first-order mode light.

The 0th-order mode light and the first-order mode light exhibits a light intensity which differs depending upon the outgoing position thereof as indicated by reference characters C1 and C2 in FIG. 7($c$). Also the phases of the 0th-order mode light and the first-order mode light differ. The light actually outputted from the end face at the end face position X is light produced by interference of the 0th-order mode light and the first-order mode light interfere with each other and has the intensity indicated by reference character C3 in FIG. 7(c).

In particular, since the intensities and phases of the 0th-order mode light and the first-order mode light differ depending upon the end face position X, when the first-order mode light and the 0th-order mode light interfere with each other, also the interference mode differs depending upon the end face position X. Therefore, even if the first-order mode light has a fixed bias shift amount which does not rely upon the end face position X and the 0th-order mode light does not have a phase variation amount, variation of the phase variation amount, that is, a spatial distribution, appears depending upon the end face position X as seen in FIG. 7(d).

The end face position X described above with reference to FIGS. 7(a) to 7(d) can be matched with the center position of the light reception face of the photodiode which serves as the light reception section 121. In particular, even if a photodiode having a comparatively large light reception diameter is disposed, such a spatial distribution of the phase variation amount as shown in FIG. 7(d) appears depending upon the center position of the light reception face for receiving the monitor light. Therefore, the value of the phase variation amount is varied by a very small displacement of the mounting position of the photodiode, which gives rise to variation of the influence on the transmission quality.

As described above, since a photodiode having a comparatively large light reception diameter is applied as the light reception section 121, the light intensity necessary for monitoring can be obtained without performing strict alignment of the position of the light reception face of the photodiode. However, the light reception section 121 receives also light produced by interference of the 0th-order mode light, which has no bias shift component, from within light outputted from the end face with the first-order mode light which has a bias shift component. Therefore, such a bias shift as described above appears, and it is difficult to grasp the bias shift amount only from the monitor light.

Since, in the output optical waveguide 105, some waveguide length is secured normally and higher-order mode light is eliminated at the outgoing point of time, the phase variation which arises when the light propagated along the monitoring optical waveguide 106 described above is received by the light reception section 121 does not appear in the output signal light outputted from the output optical waveguide 105. Therefore, if the phase variation amount regarding the output signal light outputted from the output optical waveguide 105 is ignored, then the phase variation amount of the light propagated along the monitoring optical waveguide 106 can be considered as it is as the bias shift amount.

Such a bias shift as described above with reference to FIG. 4 arises from a factor that light produced by interference of the 0th-order mode light and the higher-order mode light is received by the photodiode in this manner. Further, also the fact that mixing occurs between the 0th-order mode light and the higher-order mode light of the propagated light depending upon the bent pattern of an optical waveguide for introducing monitoring light and shifts the phase of the 0th-order mode light itself makes a factor of appearance of a bias shift if the mixing manners of the 0th-order mode light and the higher-order mode light are different from each other.

Further, also in operation point control of such an optical modulator 200 as an optical device as described hereinabove with reference to FIG. 20, some component of light monitored by means of the light reception section 121 which receives one of light fluxes branched by the half mirror 231 may possibly have the phase deviation α which makes a bias shift in the half-wavelength voltage Vπ with respect to the output light signal branched by the half mirror 231 and to be coupled to an optical fiber not shown as seen in FIG. 21 (refer to a deviation ΔV of the operation point voltage in FIG. 21).

In particular, while, in the optical modulator 200 shown in FIG. 20, light fluxes whose phase is modulated by the arm waveguides 103 are multiplexed by the MMI 104 and coupled to the output optical waveguide 105, the modulated light includes not only the 0th-order mode light to which original suitable modulation is applied but also the higher-order mode light whose phase is displaced from that of the original modulation, for example, as shown in FIG. 22.

Generally, the output optical waveguide 105 is designed such that some degree of length is secured to cut off higher-order mode light. However, under such various constraints on the design that the length of the substrate 191 is restricted for downsizing of the device and it is demanded to secure the length of the arm waveguides 103 required for reduction of the voltage, it is difficult to implement the output optical waveguide 105 which fully removes higher-order mode light. Therefore, not a little higher-order mode light remains in the output optical waveguide 105.

Where a photodiode whose light reception area is large is applied as described above as the light reception section 121 for receiving the light in which higher-order mode light remain in this manner, it receives not only the 0th-order mode light component but also the remaining higher-order mode light. Therefore, a bias shift similar to that in the case described hereinabove with reference to FIGS. 7(a) to 7(d) appears in the component monitored by the light reception section 121.

It is to be noted that all of the techniques disclosed in Patent Documents 1 to 3 suppress optical transmission of higher-order mode light but none of Patent Documents 1 to 3 discloses or suggests a configuration for suppressing the bias shift.

SUMMARY OF THE INVENTION

It is an object of the present invention to provide an optical device capable of suppressing a bias shift which is a deviation of a phase relationship between output signal light and monitoring light.

(1) In order to attain the object described above, according to an aspect of the present invention, there is provided an optical device comprising a substrate having an electro-optic effect, a modulating optical waveguide formed on a surface layer portion of the substrate and forming an interference optical modulator for modulating input light, and an output optical waveguide and a monitoring optical waveguide each formed on the surface layer portion of the substrate and branched from and connected to a downstream side portion of the modulating optical waveguide, the monitoring optical waveguide guiding light for monitoring optical modulation operation of the modulating optical waveguide, the monitoring optical waveguide having a reduced width region which has a reduced waveguide width.

(2) The waveguide width of the reduced width region may be continuously reduced along a light propagation direction of the monitoring optical waveguide.

(3) The monitoring optical waveguide may have, on the downstream side in a light propagation direction with respect to the reduced width region, a width maintaining region in which the waveguide width reduced in the reduced width region is maintained.

(4) Preferably, the optical device further comprises a reflecting portion provided at a downstream side end portion of the width maintaining region for reflecting light propagated along the monitoring optical waveguide, an outgoing end face of the substrate for the light propagated along the output optical waveguide being different from an outgoing end face of the substrate for light reflected by the reflecting portion.

(5) Further, the width of the reflection face of the reflecting portion may be substantially equal to the cut-out width of the monitoring optical waveguide.

(6) Or, the reflecting portion may be a reflection groove formed on the substrate.

(7) The output optical waveguide may include a first bent region having a shape bent at a predetermined bent angle from a portion connected to the modulating optical waveguide, and the monitoring optical waveguide may include a second bent region formed on the upstream side in the light propagation direction with respect to the reduced width region so as to bend a region including a portion thereof connected to the modulating optical waveguide at an angle corresponding to the bent angle of the first bent region.

(8) The reduced width region may radiate higher-order mode light from within the light propagated along the monitoring optical waveguide to the outside of the monitoring optical waveguide but may cause 0th-order mode light from within the light to propagate along the monitoring optical waveguide on the downstream side with respect to the reduced width region.

(9) The reduced width region may radiate higher-order mode light from within the light propagated along the monitoring optical waveguide to the outside of the monitoring optical waveguide but may cause 0th-order mode light from within the light to propagate along the monitoring optical waveguide on the downstream side with respect to the reduced width region, and the reflecting portion may be configured so as to avoid reflection of the higher-order mode light to be radiated to the outside of the monitoring optical waveguide but reflect the 0th-order mode light propagated along the monitoring optical waveguide on the downstream side with respect to the reduced width region.

(10) The modulating optical waveguide may include an input waveguide for guiding the input light and a branching and coupling waveguide connected to the downstream side of the input waveguide for branching the input waveguide to a plurality of waveguides and coupling the branched waveguides, and the output optical waveguide and the monitoring optical waveguide may be branched and connected at a downstream side portion of the branching and coupling waveguide with respect to the coupled portion.

(11) According to another aspect of the present invention, there is provided an optical device comprising a substrate having an electro-optic effect, an optical waveguide formed on a surface layer portion of the substrate and including an optical waveguide for performing optical modulation for light inputted to the substrate and an output optical waveguide and a monitoring optical waveguide branched from and connected to a downstream side portion of the modulating optical waveguide, the monitoring optical waveguide guiding light for monitoring optical modulation operation of the modulating optical waveguide, a reflecting portion being provided on the downstream side of the monitoring optical waveguide for reflecting light propagated along the monitoring optical waveguide, the width of a reflection face of the reflecting portion being substantially equal to the cut-out width of the monitoring optical waveguide.

(12) The output optical waveguide may include a first bent region having a shape bent at a predetermined bent angle from a portion connected to the modulating optical waveguide, and the monitoring optical waveguide may include a second bent region formed on the upstream side in the light propagation direction with respect to the reflection portion so as to bend a region including a portion thereof connected to the modulating optical waveguide at an angle corresponding to the bent angle of the first bent region.

(13) The optical devices according to the configurations (1) and (11) described above may further comprise an electrode for applying an optical modulation voltage to the light propagating along the modulating optical waveguide, a voltage signal generation section for generating a voltage signal to be applied to the electrode, a light reception section for receiving light propagated along the monitoring optical waveguide, and a control section for controlling the voltage signal to be generated by the voltage signal generation section based on the result of the monitoring of the light received by the light reception section.

(14) According to a further aspect of the present invention, there is provided an optical device comprising a substrate having an electro-optic effect, a modulating optical waveguide formed on a surface layer portion of the substrate and forming an interference optical modulator for modulating input light, an output optical waveguide formed on the surface layer portion of the substrate and connected to a downstream side portion of the modulating optical waveguide, and a branching monitoring section for monitoring branched light of light propagated along the output optical waveguide and emitted from an outgoing end face of the substrate, the output waveguide having a reduced width region in which the waveguide width is reduced.

(15) The output optical waveguide may have, on the downstream side in a light propagation direction with respect to the reduced width region, an increased width region in which the waveguide width reduced in the reduced width region is increased to the original waveguide width.

(16) In the optical device having the configuration (14) described above, a pair of light blocking grooves for blocking the light propagated along regions of the substrate on the opposite sides of the output optical waveguide from reaching the outgoing end face may be formed in the substrate regions on the opposite sides of the output optical waveguide at a position on the downstream side in the light propagation direction with respect to the reduced width region.

(17) In the optical device having the configuration (15) described above, a pair of light blocking grooves for blocking the light propagated along regions of the substrate on the opposite sides of the output optical waveguide from reaching the outgoing end face may be formed in the substrate regions on the opposite sides of the output optical waveguide at a position on the downstream side in the light propagation direction with respect to the reduced width region.

(18) The modulating optical waveguide may include an input waveguide for guiding the input light and a branching and coupling waveguide connected to the downstream side of the input waveguide for branching the input waveguide to a plurality of waveguides and coupling the branched waveguides, and the output optical waveguide may be connected to a portion of the branching and coupling waveguide on the downstream side with respect to the coupled portion.

(19) The optical device having the configuration (14) described above may further comprise an electrode for applying an optical modulation voltage to the light propagated along the modulating optical waveguide, a voltage signal generation section for generating a voltage signal to be applied to the electrode, and the branching monitoring section including a branching portion for branching light emitted from the outgoing end face and a light reception portion for receiving the light branched by the branching section as monitoring light, a control section for controlling the voltage signal to be generated by the voltage signal generation section based on a result of the monitoring of the light received by the light reception section.

The optical devices according to the present invention are advantageous in that higher-order mode light included in monitor light can be reduced in comparison with that by the conventional technique and the bias shift which is a deviation of a phase relationship between output signal light and monitor light can be suppressed.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIG. 6 is a diagram illustrating an example of a phase relationship between output signal light having a bias shift $\alpha$ and monitor light;

DESCRIPTION OF THE PREFERRED EMBODIMENTS

In the following, preferred embodiments of the present invention are described with reference to the accompanying drawings.

[a] First Embodiment

Figure 1:
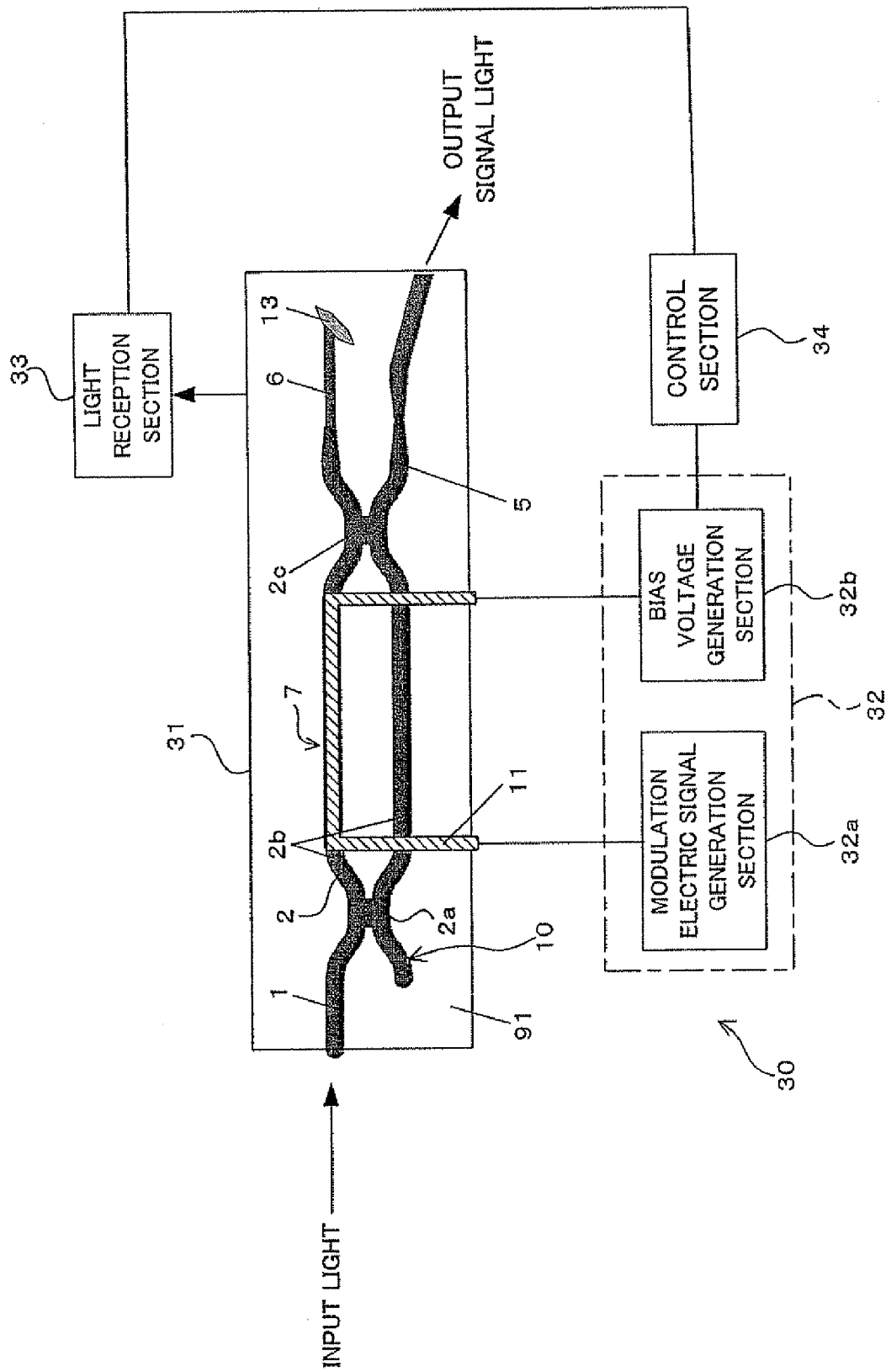
FIG. 1 is a view showing an optical device according to a first embodiment of the present invention.
Figure 2:
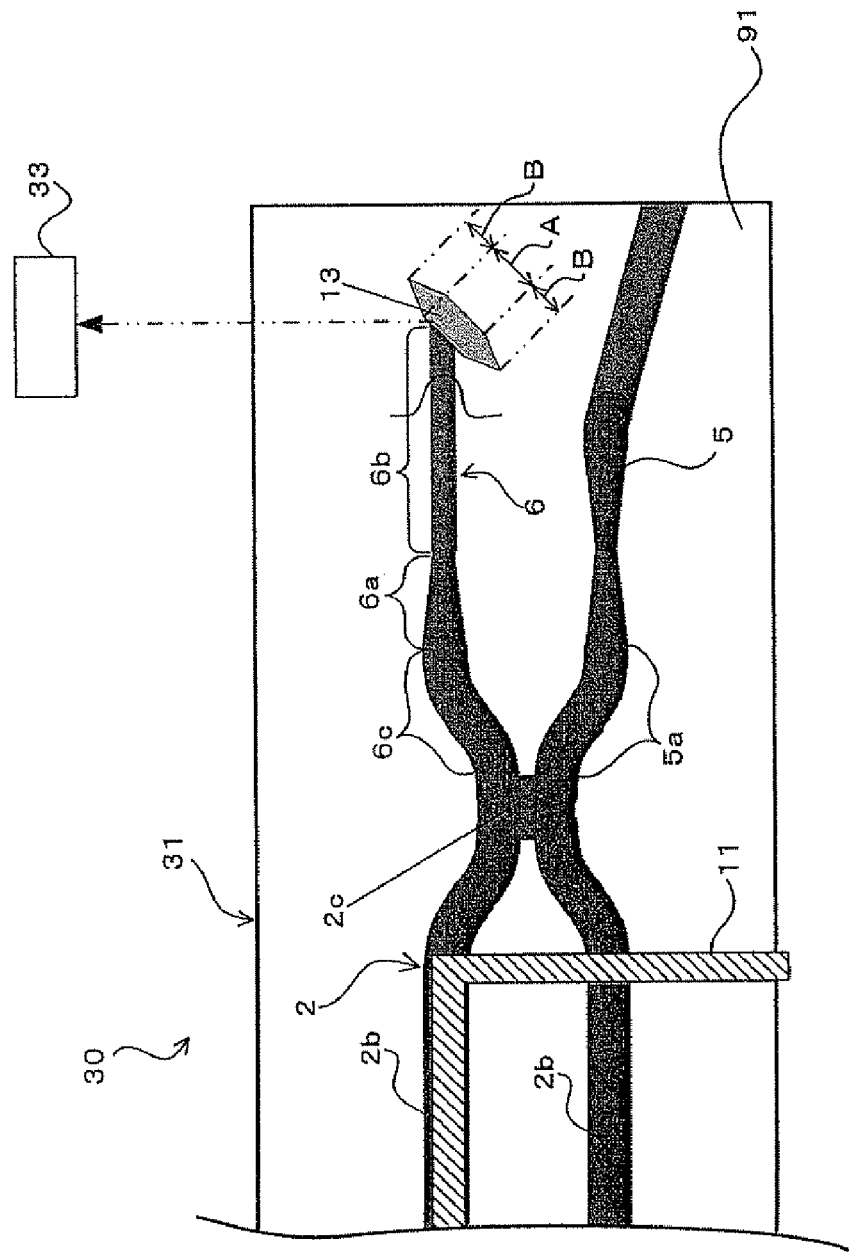
FIG. 2 is an enlarged view showing part of the optical device shown in FIG. 1.

FIG. 1 is a view showing an optical device 30 according to the first embodiment of the present invention, and FIG. 2 is an enlarged view of part of the optical device 30 shown in FIG. 1. Also the optical device 30 of the present embodiment performs optical modulation for input light based on a data signal similarly as in the optical device described hereinabove with reference to FIG. 5, and includes an optical waveguide device 31, a voltage signal generation section 32, a light reception section 33 and a control section 34 for controlling a voltage signal generated by the voltage signal generation section 32 based on a result of monitoring of light received by the light reception section 33.

Here, the optical waveguide device 31 includes a substrate 91 made of lithium niobate (LiNbO3) or the like and having an opto-electric effect, and further includes an optical waveguide 10, an electrode 11 and a reflection groove 13 formed on the substrate 91. The voltage signal generation section 32 generates a voltage signal to be applied to the electrode 11 and includes a modulation electric signal generation section 32a and a bias voltage generation section 32b similar to those indicated by reference numerals 123 and 124 described hereinabove with reference to FIG. 5, respectively.

The light reception section 33 receives light propagated along a monitoring optical waveguide 6 which forms the optical waveguide 10, and the control section 34 controls the voltage signal generated by the voltage signal generation section 32. Accordingly, the light reception section 33 and control section 34 are basically similar to those indicated by reference numerals 121 and 125 in FIG. 5 described hereinabove, respectively.

Here, the modulation electric signal generation section 32a supplies a voltage signal for modulating input light to the electrode 11 using a modulation scheme such as, for example, the duo binary, DPSK or DQPSK scheme. In particular, in the present embodiment, since monitor light wherein the bias shift is suppressed in such a manner as hereinafter described can be obtained, the demanded transmission quality can be implemented also where a modulation method with which it is estimated to have a strict allowance for the bias shift is used. In other words, the control section 34 can control the bias voltage to be generated by the bias voltage generation section 32b based on the light, whose bias shift is suppressed, received by the light reception section 33.

The optical waveguide 10 is formed on a surface layer portion of the substrate 91, and includes an optical waveguide 7 for optical modulation for modulating light inputted to the substrate 91 and a monitoring optical waveguide 6 for guiding light for monitoring optical modulation operation of an output optical waveguide 5 and the modulating optical waveguide 7 which are formed by branching and connected to a downstream side portion of the modulating optical waveguide 7.

The light modulating optical waveguide 7 is a modulating optical waveguide which forms an interference type optical modulator for modulating the input light and has a configuration of, for example, a Mach-Zehnder type optical waveguide. In the present embodiment, the light modulating optical waveguide 7 is a Mach-Zehnder type optical waveguide which has an input waveguide 1 for guiding the input light inputted to the substrate 19, and a branching and coupling waveguide 2 connected to the downstream side of the input waveguide 1 for branching the input waveguide 1 to a plurality of waveguides and coupling the branched waveguides. Further, the output optical waveguide 5 and monitoring optical waveguide 6 are divergingly connected at a portion of the downstream side with respect to the coupling portion of the branching and coupling waveguide 2.

The branching and coupling waveguide 2 includes a plurality of arm waveguides (in the present embodiment, two waveguides) 2b for guiding light branched from the input light from the input waveguide 1, a first connection portion 2a for connecting the input waveguide 1 and the arm waveguides 2b and branching the input light from the input waveguide 1 to the plural arm waveguides 2b, and a second connection portion 2c for connecting the arm waveguides 2b, output optical waveguide 5 and monitoring optical waveguide 6 and coupling the light from the arm waveguides 2b and then branching the coupled light to the output optical waveguide 5 and the monitoring optical waveguide 6.

It is to be noted that, to the first connection portion 2a and the second connection portion 2c described above, a configuration for branching and coupling the light while maintaining a matching relationship in phase between the input light and output light is applied. For example, the first and second connection portions 2a and 2c can be formed using an MMI, a directional coupling waveguide or an optical coupler.

Here, in the present embodiment, the monitoring optical waveguide 6 includes a reduced width region 6a wherein the waveguide width of the downstream side the monitoring optical waveguide 6 in the light propagation direction is reduced with respect to that of the upstream side. The reduced width region 6a can be formed, for example, from a tapering waveguide pattern region 6a wherein the waveguide width is continuously reduced along the optical propagation direction of the monitoring optical waveguide 6. Further, in the monitoring optical waveguide 6, a width maintaining region 6b in which the waveguide width reduced in the reduced width region 6a is maintained is included on the downstream side in the optical propagation direction with respect to the reduced width region 6a.

Consequently, in the reduced width region 6a, higher-order mode light from within the light propagated along the monitoring optical waveguide 6 is emitted to the outside of the monitoring optical waveguide 6, but 0th-order mode light can be propagated along the width maintaining region 6b which forms the monitoring optical waveguide 6 on the downstream side of the reduced width region 6a. In particular, when the monitoring light from the second connection portion 2c passes the reduced width region 6a described above, the 0th-order mode light is confined in the inside of the monitoring optical waveguide 6 while the higher-order mode light is cut off positively such that higher-order mode light such as first-order mode light can be spatially separated from the monitoring optical waveguide 6.

Figure 5:
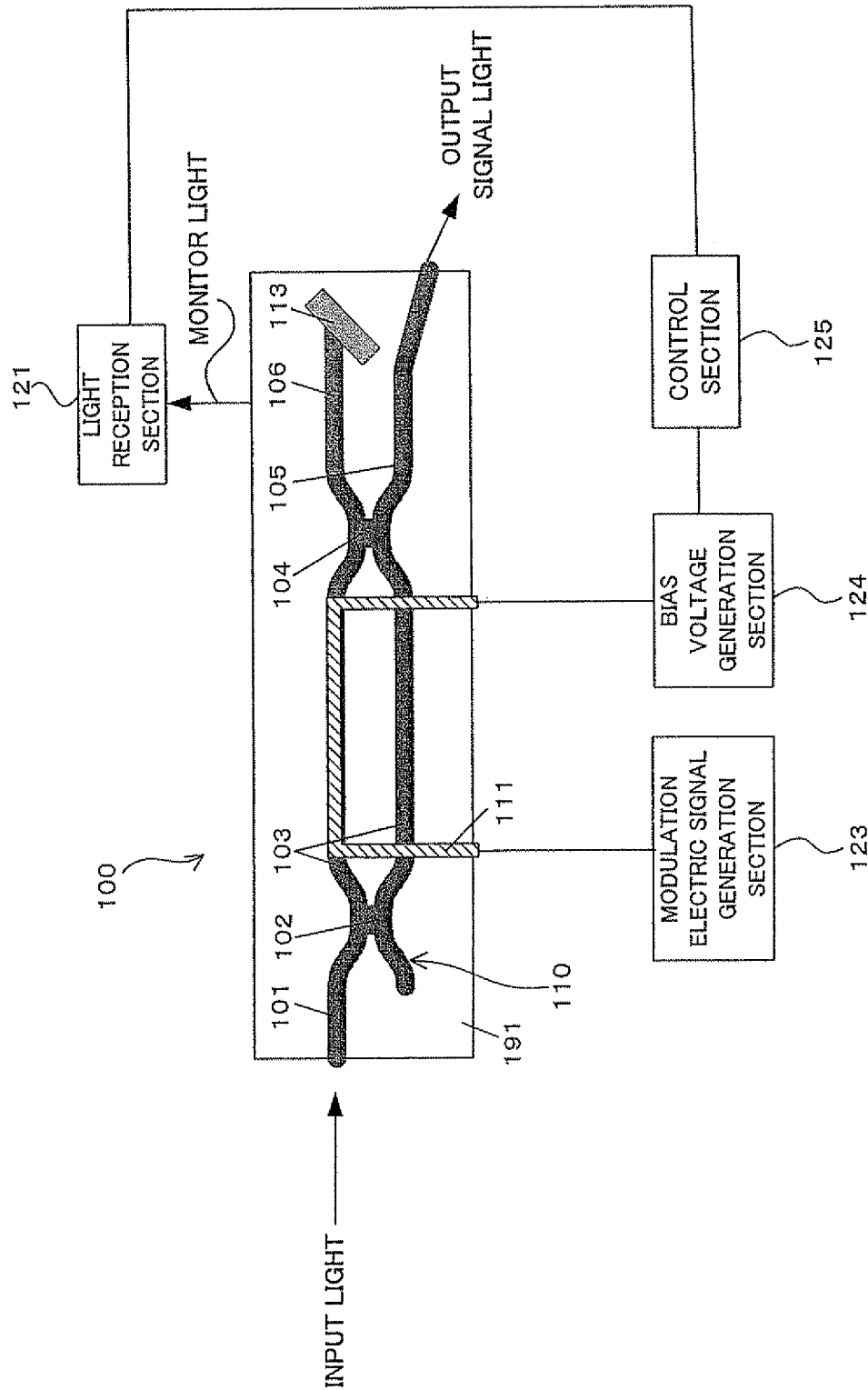
FIG. 5 is a view showing a conventional optical device.
Figure 7A:
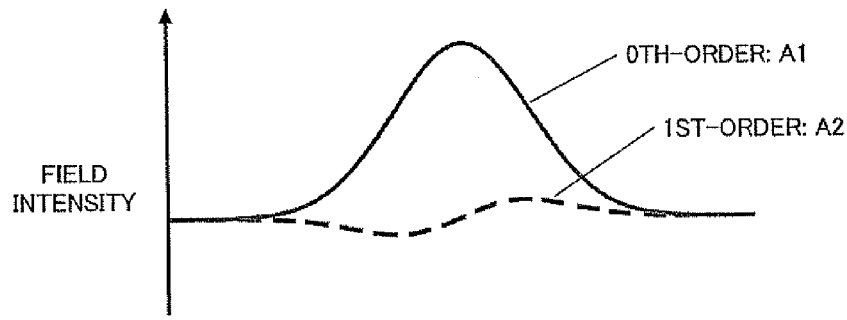
FIGS. 7(a) and 7(d) are diagrams illustrating appearance of the bias shift $\alpha$ in the optical modulator shown in FIG. 5.
Figure 7B:
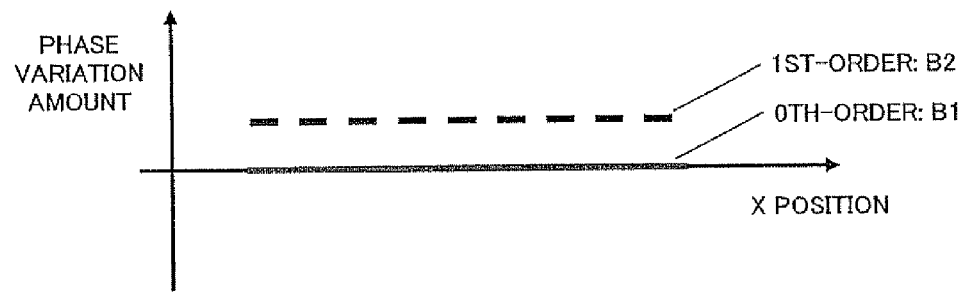
Figure 7C:
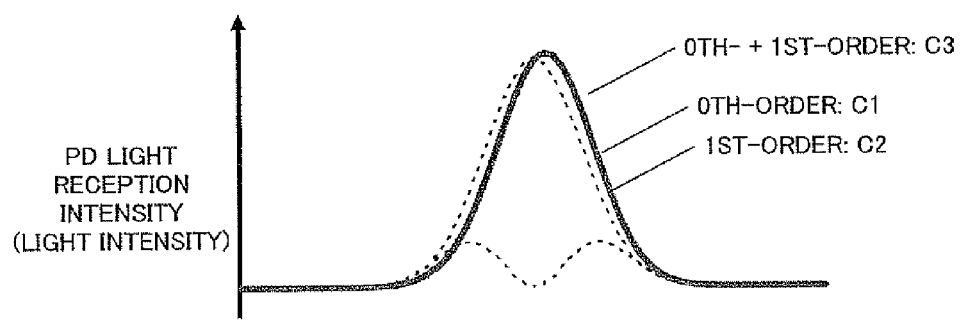
Figure 7D:
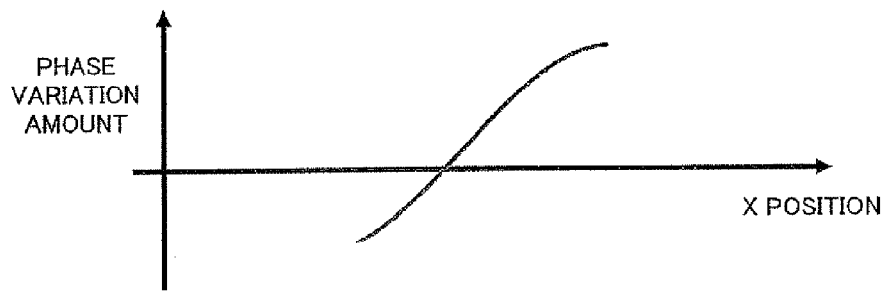

Particularly, as described hereinabove with reference to FIG. 5, where the configuration of the reduced width region 6a is not applied and separation of higher-order mode light is not performed positively, the bias shift value remains, for example, by approximately +/−3% as a ratio of the phase deviation within a unit period. However, where the reduced width region 6a is configured such that the waveguide is tapered such that the width thereof decreases from 7 μm to 4 μm, the bias shift value can be suppressed, for example, within approximately 1% as the ratio described above.

Further, the reflection groove 13 is a reflecting portion which reflects light propagated along the width maintaining region 6b at the downstream side end of the width maintaining region 6b which forms the monitoring optical waveguide 6. Consequently, the outgoing end face of the substrate 91 from which outgoes the monitoring light reflected by the reflection groove 13 can be provided so as to be different from the outgoing end face of the light propagated along the output optical waveguide 5.

Then, the reflection groove 13 has a reflection face corresponding to the waveguide width of the width maintaining region 6b. In particular, as indicated by reference character A in FIG. 2, the width of the reflection face of the reflection groove 13 is set substantially equal to the cut-off width in the light propagation direction of the width maintaining region 6b which forms the monitoring optical waveguide 6.

In other words, the reflection groove 13 is formed in the following manner. In particular, the reflection angle and the reflection face shape of the width maintaining region 6b with respect to the propagation direction of 0th-order mode light are set such that reflection of higher-order mode light to be emitted to the outside of the monitoring optical waveguide 6 to the end face opposing the light reception section 33 is avoided while the 0th-order mode light propagated along the width maintaining region 6b which is the monitoring optical waveguide on the downstream side of the reduced width region 6a is reflected to the end face opposing to the light reception section 33.

In particular, the reflection groove 13 has such a groove shape that a beam of the 0th-order mode light which makes reflection light is included in the light reception face of the photodiode which forms the light reception section 33 within a width range (refer to reference character A in FIG. 2) on an extension of the width maintaining region 6b but the reflection light is pointed to in a direction diverted from the light reception section 33 on the outside (refer to reference character B in FIG. 2) of the width range A on an extension of the width maintaining region 6b. As a result, higher-order mode light inputted to the outside B of the width range A on an extension of the width maintaining region 6b is diverted from the light reception face of the light reception section 33.

Further, in the reflection groove 13 having such a configuration as described above, in comparison with an alternative case wherein a reflection groove having only the width range A is formed, the cut-off effect on the higher-order mode light inputted to the light reception section 33 can be set substantially equal by reflection while a demand for the accuracy required for a groove forming step is moderated.

Figure 3A:
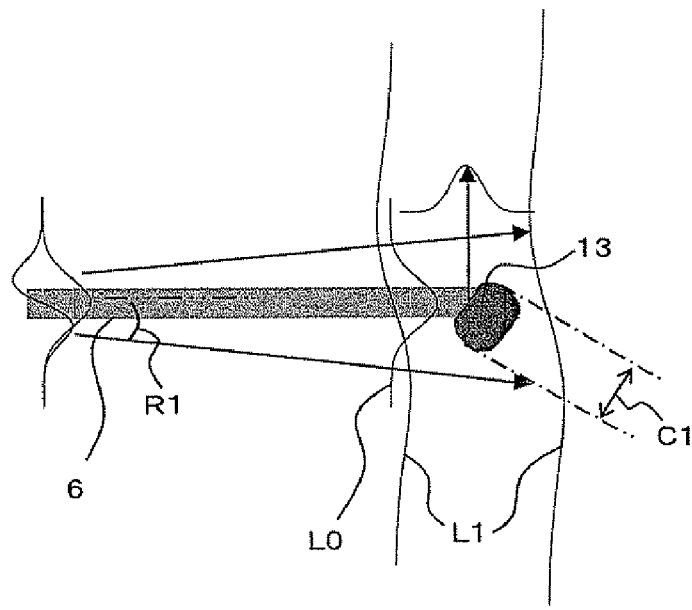
FIGS. 3(a) and 3(b) are diagrams illustrating actions of the first embodiment of the present invention.
Figure 3B:
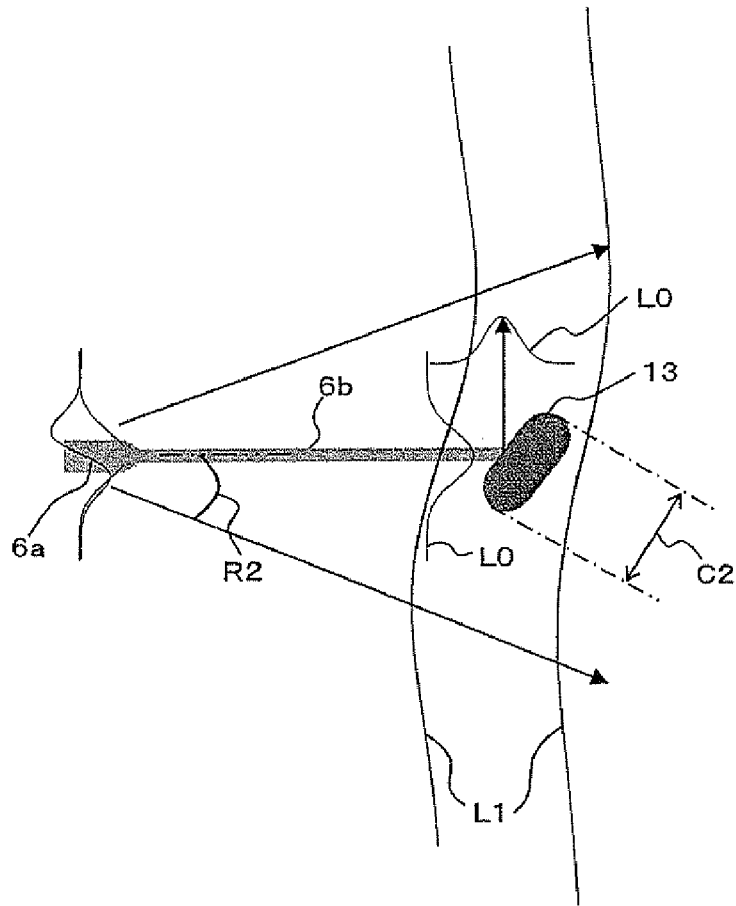
Figure 4:
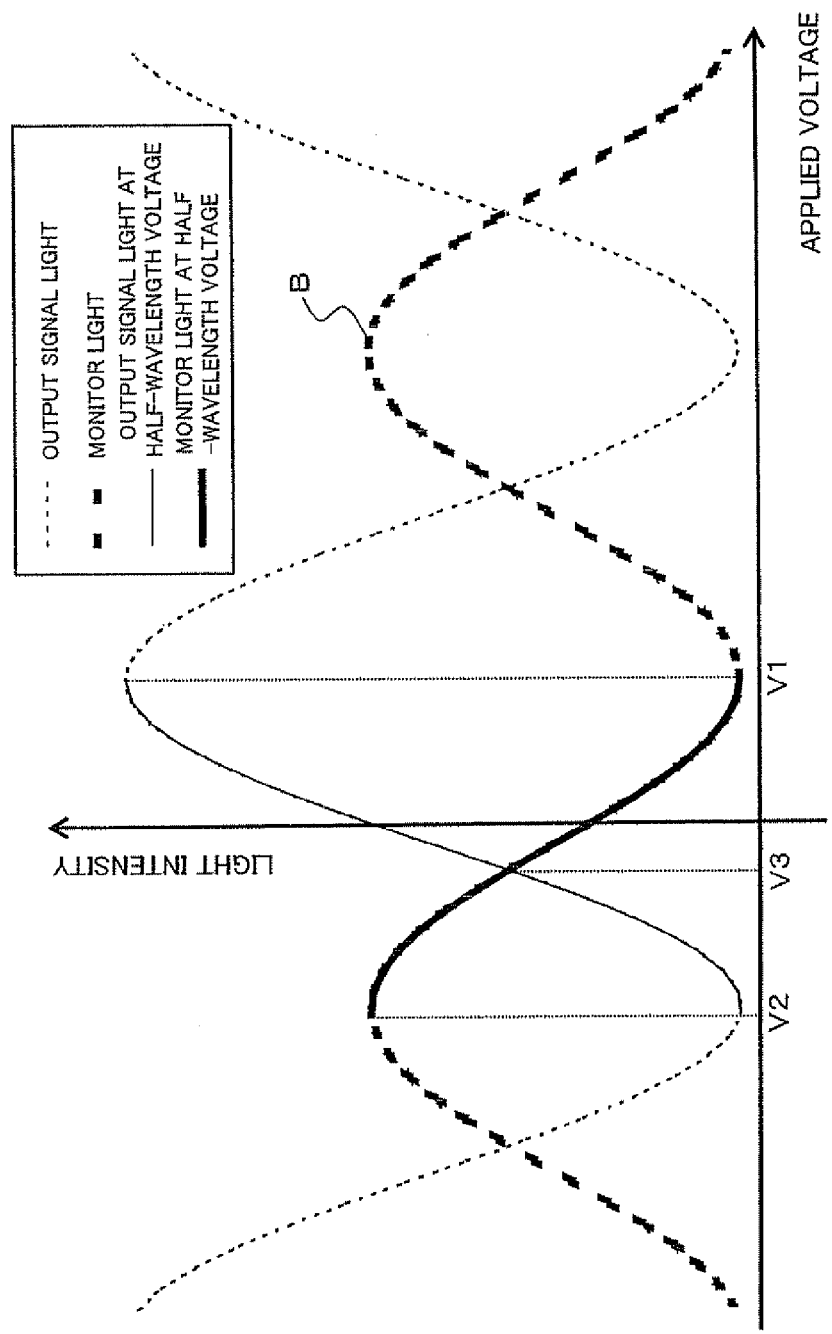
FIG. 4 is a diagram illustrating an example of an ideal phase relationship between output signal light and monitor light.

Further, in the present embodiment, as shown in FIG. 3(b), the monitoring optical waveguide 6 includes the reduced width region 6a. Therefore, in comparison with an alternative case wherein a monitoring optical waveguide 6' which does not include the reduced width region 6a is applied [refer to reference character R1 in FIG. 3 (*a*)], a radiation angle R2 of higher-order mode light L1 with respect to the propagation direction of 0th-order mode light L0 can be increased, and therefore, the higher-order mode light L1 can be separated by a greater amount from the 0th-order mode light L0 at the stage of incoming to the reflection groove 13.

Accordingly, where the monitoring optical waveguide 6' which does not include the reduced width region 6a is applied, since a situation that the higher-order mode light L1 whose degree of separation from the 0th-order mode light is comparatively low undergoes reflection toward the reflection face of the light reception section 33 must be avoided, preferably the size C1 of the reflection face to be formed as the reflection groove 13 must be comparatively small as seen in FIG. 3(*a*).

On the other hand, where such a monitoring optical waveguide 6 which includes the reduced width region 6a as in the present embodiment is applied, since it is sufficient only if a situation that the higher-order mode light whose degree of separation from the 0th-order mode light is comparatively high undergoes reflection toward the reflection face of the light reception section 33 as shown in FIG. 3(*b*), the size C2 of the reflection face to be formed as the reflection groove 13 may be formed comparatively large. Accordingly, where the configuration is applied wherein the reduced width region 6a is formed, incoming of the higher-order mode light to the light reception section 33 can be eliminated with a higher degree of accuracy while a demand for device fabrication accuracy regarding the reflection groove 13 is reduced from that in the case shown in FIG. 3(*a*) so that occurrence of a bias shift can be prevented.

In particular, for example, where the monitoring optical waveguide 6' which does not include the reduced width region 6a is applied and the width of the optical waveguide 6' is set to 7 μm, if the size C1 of the reflection face to be formed as the reflection groove 13 is set such that the reflection groove 13 is formed so as to be inclined by 45 degrees with respect to the waveguide advancing direction and the length of the reflection face is set to approximately 15 μm as shown in FIG. 3(*a*), then the value of the bias shift can be efficiently suppressed. On the other hand, where the monitoring optical waveguide 6 including the reduced width region 6 is applied, even if the size C2 of the reflection face to be formed as the reflection groove 13 is set to approximately 30 μm as shown in FIG. 3(*b*), a sufficient suppression effect of the value of the bias shift can be obtained.

Incidentally, as shown in FIG. 2, the output optical waveguide 5 includes a first bent region 5a having a shape bent at a predetermined bent angle from a portion at which the output optical waveguide 5 is connected to the modulating optical waveguide 7. Also the monitoring optical waveguide 6 includes a second bent region 6c having a shape bent from a portion at which the output optical waveguide 5 is connected to the modulating optical waveguide 7. In other words, the monitoring optical waveguide 6 in the present embodiment is composed of the second bent region 6c, reduced width region 6a and width maintaining region 6b which are successively formed from a starting point provided by a connection portion of the monitoring optical waveguide 6 from the second connection portion 2c which forms the modulating optical waveguide 7.

Here, in the light introduced, for example, from an MMI which forms the second connection portion 2c and propagated along the first bent region 5a of the output optical waveguide 5 and the second bent region 6c of the monitoring optical waveguide 6, phase variation occurs with the 0th-order mode light itself upon mixing between the 0th-order mode light and the first-order mode light. In particular, if such mixing occurs between the 0th-order mode light and the first-order mode light because of the waveguide bend at the first and second bent regions 5a and 6c or the like, then phase variation occurs also with the 0th-order mode light outputted from the waveguides 5 and 6.

As described above, in the process of the light propagation along the waveguides 5 and 6, a bias shift described above appears depending upon the deviation in phase variation of outgoing light caused by the mixing between the 0th-order mode light and the first-order mode light. In other words, even if such mixing as described above occurs between the 0th-order mode light and the first-order mode light in the waveguides 5 and 6, only if the deviation phase variation does not occur, then a relative phase difference between the output signal light and the monitoring light does not appear, and no trouble occurs with the feedback control by the control section 34 (refer to FIG. 1).

In particular, even if such mixing should occur, it is important to cause such mixing to occur equally in the output optical waveguide 5 and the monitoring optical waveguide 6 so that a relative phase difference of 0th-order mode light components outputted from the waveguides 5 and 6 may not appear. In order to achieve the subject just described, the degrees of the bend of the output optical waveguide 5 and the monitoring optical waveguide 6 on the downstream side of the second connection portion 2c are set substantially equal to each other. Consequently, the phase deviation between the 0th-order mode light components outputted from the output optical waveguide 5 and the monitoring optical waveguide 6 can be reduced.

In particular, the second bent region 6c of the monitoring optical waveguide 6 is configured such that a region on the upstream side in the light propagation direction with respect to the reduced width region 6a including the portion at which the monitoring optical waveguide 6 is connected to the modulating optical waveguide 7 is bent at an angle corresponding to the bent angle of the first bent region 5a.

In the present embodiment, not only the first bent region 5a of the output optical waveguide 5 and the second bent region 6c of the monitoring optical waveguide 6 but also the region 5b of the output optical waveguide 5 on the downstream side of the first bent region 5a and the reduced width region 6b of the monitoring optical waveguide 6 are formed in a pattern so as to have a line symmetric relationship with each other with respect to an axis of the light propagation direction. In particular, if the pattern is formed such that the regions until after the higher-order mode light components are substantially separated from the light propagated along the output optical waveguides 5 and 6 are formed in symmetrical shapes, then the manners of mixing between the 0th-order mode light components and first-order mode light components propagated along the output optical waveguide 5 and the monitoring optical waveguide 6 can be made substantially equal to each other. Further, if the manners of separation of the 0th-order mode light and the first-order mode light in the reduced width regions 5b and 6a are made substantially equal to each other, then the phase deviation between the 0th-order mode light components individually outputted from the output optical waveguide 5 and the monitoring optical waveguide 6 can be substantially cancelled.

In the optical device 30 configured in such a manner as described above, input light inputted to the input waveguide 1 is phase modulated by the arm waveguides 2b utilizing the voltage applied from the electrode 11, and the modulated light fluxes are multiplexed by the second connection portion 2c and then coupled to the output optical waveguide 5 and the monitoring optical waveguide 6. Where the second connection portion 2c is formed from an MMI, modulated light fluxes having a relationship of phases reversed to each other are outputted individually to the output optical waveguide 5 and the monitoring optical waveguide 6.

At this time, the modulation light fluxes to be outputted to the output optical waveguide 5 and the monitoring optical waveguide 6 include not only a 0th-order mode light component to which original suitable modulation is applied but also higher-order mode light components whose phase is deviated from that by the original modulation. There is the possibility that 0th-order mode light and first-order mode light included in the light propagated along the output optical waveguide 5 and the monitoring optical waveguide 6 may act as a factor of appearance of such a bias shift as described hereinabove.

On the other hand, in the present embodiment, since the reduced width region 6a for reducing the waveguide width of the monitoring optical waveguide 6 is included in the monitoring optical waveguide 6, reception of higher-order mode light is eliminated and 0th-order mode light is received with a little loss at the point of time at which the light propagated along the output optical waveguide 5 is received by the photodiode which forms the light reception section 33. Therefore, even if there is a constraint in design on the monitoring optical waveguide 6 in that the waveguide length of the monitoring optical waveguide 6 must be formed shorter than that of the output optical waveguide 5, and even if high-accuracy alignment of the arranging position of the light reception section 33, that is, the light reception face position, is not performed, the higher-order mode light can be removed efficiently upon light reception by the light reception section 33.

Further, where the configuration that the light propagated along the monitoring optical waveguide 6 is reflected by the reflection groove 13 and the reflected light is received by the light reception section 33 is applied, incoming of higher-order mode light to the light reception section 33 can be eliminated with a high degree of accuracy while moderating the demand for the device fabrication accuracy regarding the reflection groove 13 in comparison with that in the case wherein the reduced width region 6a is not formed.

Further, the monitoring optical waveguide 6 includes the second bent region 6c which is placed on the upstream side in the light propagation direction with respect to the reduced width region 6a and is formed by bending the region including the place, at which the monitoring optical waveguide 6 is connected to the modulation waveguide 7, at an angle corresponding to the bent angle of the first bent region 5a. Therefore, if the manners of mixing of the 0th-order mode light components and the first-order mode light components propagated along the output optical waveguide 5 and the monitoring optical waveguide 6 are set substantially equal to each other and also the separation manners of the 0th-order mode light components and the first-order mode light components in the reduced width regions 5b and 6a are set substantially equal to each other, then the phase deviation between the 0th-order mode light components emitted from the output optical waveguide 5 and the monitoring optical waveguide 6 can be substantially cancelled.

In this manner, with the present embodiment, there is an advantage that, since the monitoring optical waveguide 6 includes the reduced width region 6a for reducing the waveguide width of the monitoring optical waveguide 6, higher-order mode light components included in the light to be received by the light reception section 33 can be reduced in comparison with those in the case according to the conventional technique and the bias shift which is a deviation of a phase relationship between output signal light and monitor light can be suppressed.

Further, the configuration is applied that the reflection groove 13 for reflecting the light propagated along the monitoring optical waveguide 6 is provided on the downstream side of the monitoring optical waveguide 6 and the width of the reflection face of the reflection groove 13 corresponds to the waveguide width of the monitoring optical waveguide 6. Therefore, there is an advantage that, since the 0th-order mode light whose comparatively great part is confined in and transmitted along the monitoring optical waveguide 6 is reflected positively toward the light reception section 33 while reflection of the higher-order mode light components can be eliminated in comparison with that of the 0th-order mode light, the higher-order mode light components included in the light to be received by the light reception section 33 can be reduced in comparison with those in the case according to the conventional technique and the bias shift which is a deviation of a phase relationship between output signal light and monitor light can be suppressed.

Further, since not only the reduced width region 6a but also the reflection groove 13 are formed, incoming of higher-order mode light to the light reception section 33 can be eliminated with a higher degree of accuracy while moderating the demand for the device fabrication accuracy regarding the reflection groove 13 in comparison with that of the case wherein the reflection groove 13 is provided without forming the reduced width region 6a.

Further, the monitoring optical waveguide 6 includes the second bent region 6c which is disposed on the upstream side in the light propagation direction with respect to the reduced width region 6a and is formed by bending the region including the portion at which the monitoring optical waveguide 6 is connected to the modulation waveguide 7 at an angle corresponding to the bent angle of the first bent region 5a. Therefore, if the mixing manners of the 0th-order mode light components and the first-order mode light components propagated along the output optical waveguide 5 and the monitoring optical waveguide 6 are set substantially equal to each other and also the separation manners of the 0th-order mode light components and the first-order mode light components in the reduced width regions 5b and 6a are set substantially equal to each other, then the phase deviation between the 0th-order mode light components outputted from the output optical waveguide 5 and the monitoring optical waveguide 6 can be substantially cancelled.

[b] Second Embodiment

Figure 9:
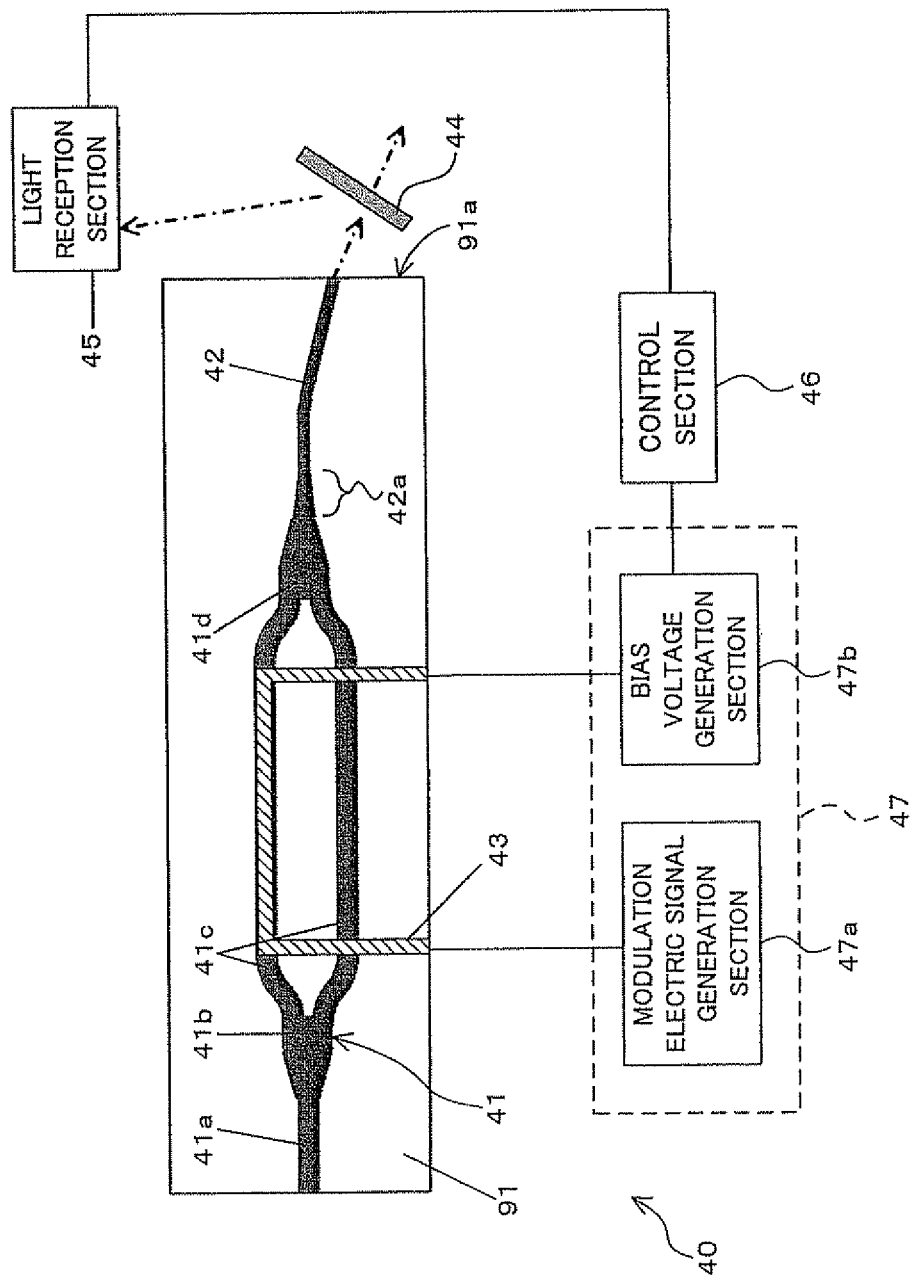
FIG. 9 is a view showing an optical modulator as an optical device according to the second embodiment of the present invention.

FIG. 9 is a view showing an optical modulator 40 as an optical device according to a second embodiment of the present invention. Here, the optical modulator 40 shown in FIG. 9 includes an output optical waveguide 42 different from that shown in FIG. 20 described above.

In particular, the optical modulator 40 according to the second embodiment includes a substrate 91 made of $LiNbO_3$ or the like and having an opto-electric effect. A modulating optical waveguide 41 which forms an interference type optical modulator for modulating input light, an output optical waveguide 42 connected to a portion on the downstream side of the modulating optical waveguide 41, and a traveling wave electrode (electric waveguide) 43 for supplying a modulation signal voltage to light propagated along the modulating optical waveguide 41 are formed on an outer layer portion of the substrate 91. Further, the optical modulator 40 includes a half mirror 44, a light reception section 45, a control section 46, and a bias voltage generation section 47b and a modulation electric signal generation section 47a which form a voltage signal generation section 47.

The modulating optical waveguide 41 includes an input light waveguide 41a for receiving input light, an MMI 41b for branching input light from the input light waveguide 41a into two light fluxes, two arm waveguides 41c for applying a relative optical path length difference to the two light fluxes branched by the MMI 141b using a modulation signal voltage applied to the traveling wave electrode 43, and an MMI 41d for multiplexing the light fluxes from the two arm waveguides 41c.

In particular, a branching and coupling waveguide connected to the downstream side of the input light waveguide 41a for branching the input light waveguide 41a into a plurality of waveguides and coupling the branched waveguides is formed from the MMI 41b, arm waveguides 41c and MMI 41b, and the output optical waveguide 42 is connected to a portion on the downstream side of the MMI 41d which is a coupling portion in the branching and coupling waveguide.

Further, while a modulation voltage signal to be supplied to the traveling wave electrode 43 is generated by the modulation electric signal generation section 47a, a bias voltage for operation point voltage control for the modulation voltage signal generated by the modulation electric signal generation section 47a is further generated by the bias voltage generation section 47b and is supplied to the traveling wave electrode 43 described above. It is to be noted that the modulation electric signal generation section 47a can generate a modulation voltage signal according to a modulation method such as, for example, the duo binary, DPSK, DQPSK method or the like described above.

The half mirror 44 as the branching portion corresponds to the half mirror (reference numeral 231) described hereinabove with reference to FIG. 20, and branches, as monitor light, part of light from within light (signal light in a modulated state) propagated along the output optical waveguide 42 and outputted from an outgoing end face 91a of the substrate 91, but outputs the remaining part of the signal light as main signal light toward an output optical fiber or the like not shown. Also the light reception section 45 corresponds to the light reception section (reference numeral 121) shown in FIG. 20, and receives light (monitor light) branched for monitoring by the half mirror 44 and outputs an electric signal having an amplitude in accordance with the light amount of the received light as a result of monitoring to the control section 46. Further, as the light reception section 45, a photodiode having a comparatively wide light reception face is used. Accordingly, a branching monitoring section for monitoring the light branched from the light propagated along the output optical waveguide 42 and outputted from the outgoing end face 91a of the substrate 91 is formed from the half mirror 44 and the light reception section 45 described above.

The control section 46 feedback controls the bias voltage in the bias voltage generation section 47b based on the value of the monitor light (electric signal amplitude in accordance with the light amount of the monitor light) from the light reception section 45. In other words, the voltage signal generation section 47 for generating the voltage signal to be applied to the electrode 43 is formed from the bias voltage generation section 47b and the modulation electric signal generation section 47a described above, and the control section 46 controls the voltage signal to be generated by the bias voltage generation section 47b serving as a voltage signal generation section based on a result of the monitoring of the light received by the light reception section 45.

In the configuration of the optical modulator 200 described hereinabove with reference to FIG. 20, not only 0th-order mode light to which original suitable modulation is applied but also higher-order mode light (for example, first-order mode light) whose phase is displaced from that of an original modulation component are mixed in the modulated light propagated along the output optical waveguide 105. As described above, the higher-order mode light makes a cause of occurrence of a bias shift upon light reception by the light reception section 121.

On the other hand, in the second embodiment, in order to separate higher-order mode light which makes a cause of appearance of a bias shift described above from 0th-order mode light to which original suitable modulation is applied, a reduced width region 42a having a reduced waveguide width is provided on the output optical waveguide 42. The reduced width region 42a is formed such that the waveguide width is continuously reduced along a propagation direction of the light from the MMI 41d. Further, the waveguide length of the reduced width region 42a, that is, the region length of the continuously narrowed output optical waveguide 42, is sufficiently long to achieve a separation effect of higher-order mode light.

Then, by the reduced width region 42a included in the output optical waveguide 42, the higher-order mode light and the 0th-order mode light can be spatially separated from each other so that the higher-order mode light can be positively cut off. In particular, if the higher-order mode light is cut off in the reduced width region 42a, then the mixture amount of higher-order mode light in 0th-order mode light propagated in a region of the output optical waveguide 42 on the downstream side of the reduced width region 42a can be reduced in comparison with that in the case shown in FIG. 20 described above.

In particular, where the output optical waveguide whose width is continuously reduced is provided, even if the length of the substrate is limited and even if the length of the output optical waveguide is limited from a factor of assurance of the length of the arm waveguides or the like, mixture of higher-order mode light can be prevented.

It is to be noted that, in FIG. 9, the output optical waveguide 42 has a configuration wherein light is guided obliquely with respect to the outgoing end face 91a in order to suppress the reflection attenuation on the outgoing end face 91a.

Figure 20:
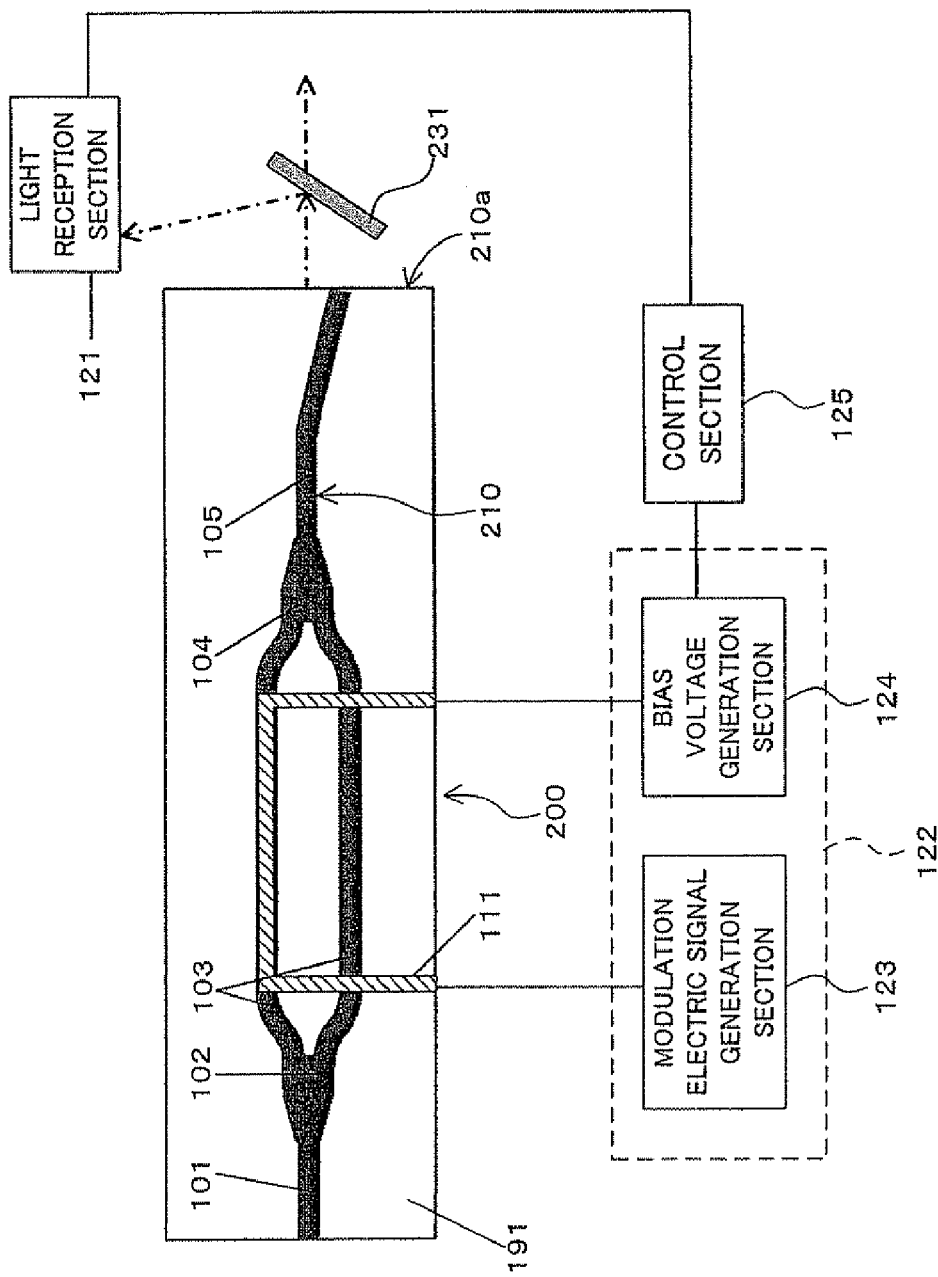
FIG. 20 is a view showing a conventional optical device.
Figure 21:
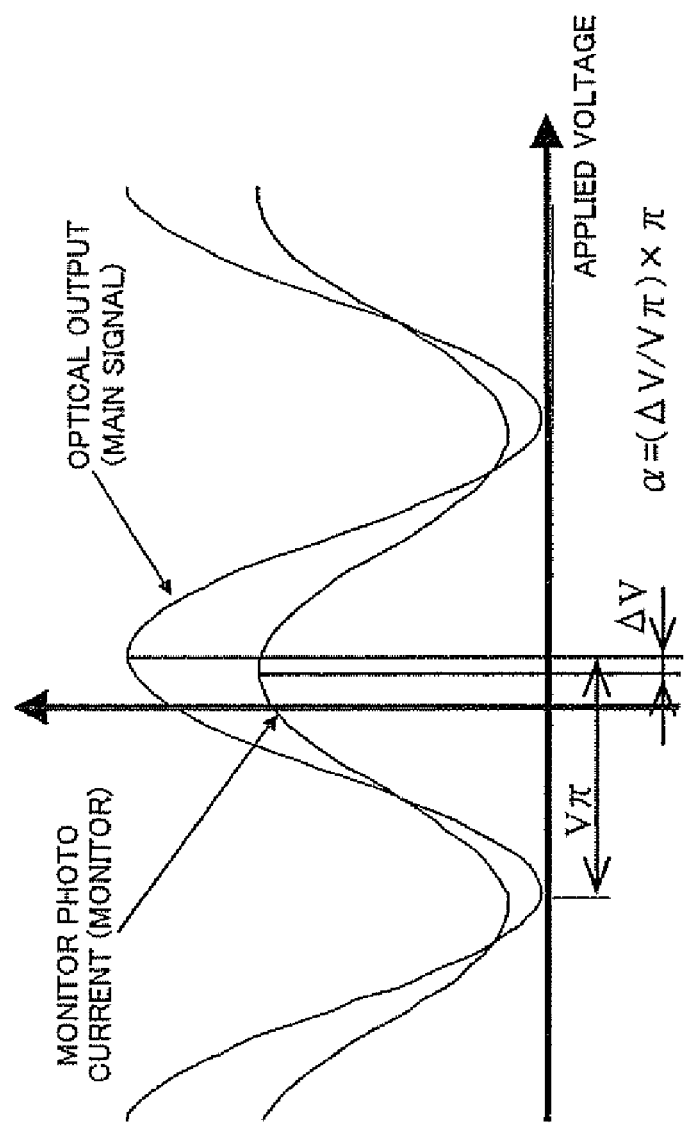
FIG. 21 is a view illustrating an example of a phase relationship between output signal light having a bias shift and monitor light.
Figure 22:
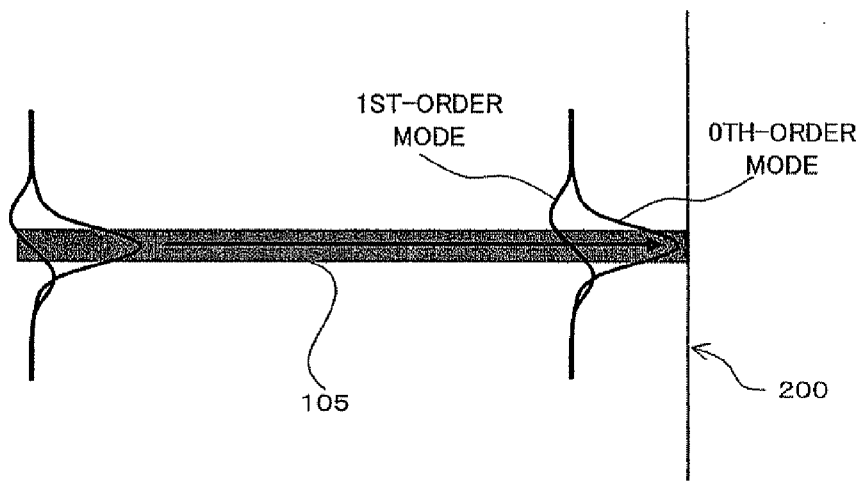
FIG. 22 is a view illustrating mixture of higher-order mode light in addition to 0th-order mode light.

Consequently, also in the monitor light received by the light reception section 45 through the half mirror 44, mixing of higher-order mode light can be reduced in comparison with that in the case of FIG. 20. Accordingly, also the bias shift amount included in the electric signal in the light reception section 45 can be reduced in comparison with that in the case of FIG. 20.

Figure 10A:
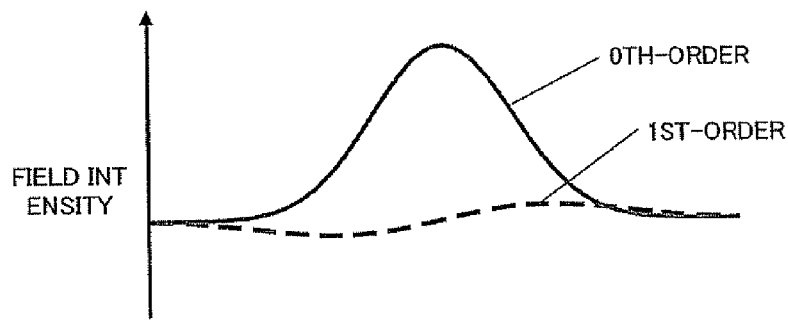
FIGS. 10(a) to 10(d) are diagrams illustrating a reduction effect of the bias shift by the optical modulator shown in FIG. 9.

FIGS. 10(a) to 10(d) are views illustrating a reduction effect of the bias shift by the optical modulator 40 shown in FIG. 9 in comparison with that (FIGS. 7(a) to 7(d)) in the case of the bias shift appearing in the case of the configuration shown in FIG. 20. As seen in FIG. 10(a), the distribution of the field intensity according to the end face position on the outgoing end face 91a (refer to FIG. 9) extends along the direction of the axis of abscissa in comparison with that of the case (refer to FIG. 7(a)) corresponding to the configuration in FIG. 20 while the intensity is reduced.

Figure 10B:
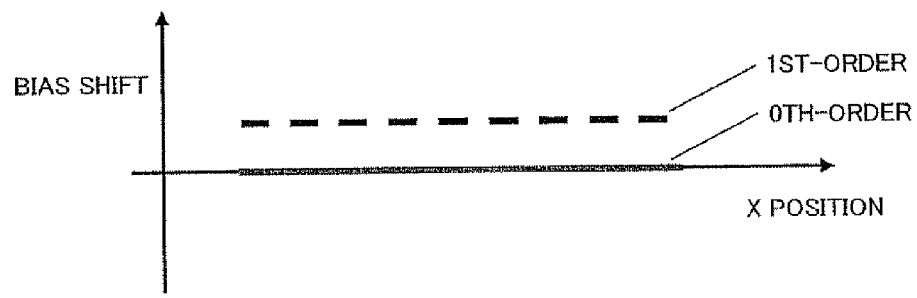
Figure 10C:
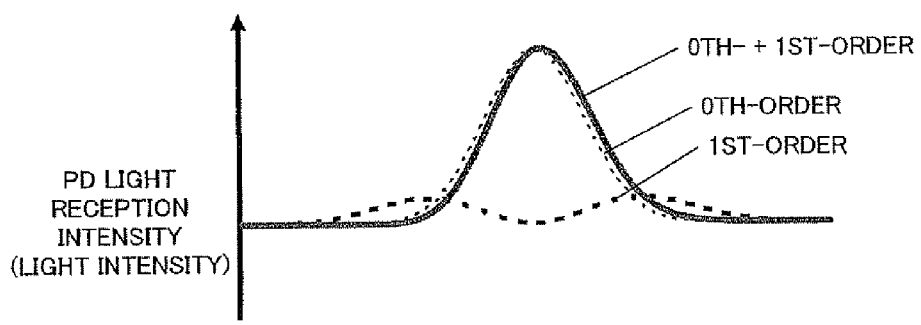
Figure 10D:
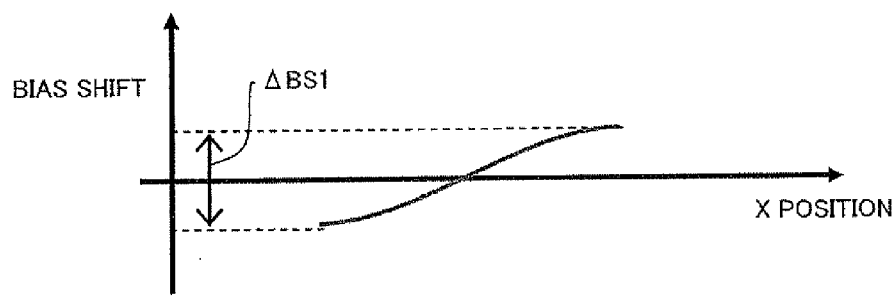

Accordingly, as seen in FIG. 10(b), even if there is a phase variation amount component regarding the first-order mode light, the interference between first-order mode light and 0th-order mode light is low in comparison with that in the conventional structure shown in FIG. 20. Further, the first-order mode light component to be received by the photodiode as the light reception section 45 is reduced as seen in FIG. 10(c). Therefore, the variation amount ΔBS1 of the bias shift according to the center position of the light reception face of the photodiode which forms the light reception section 45 can be suppressed as seen in FIG. 10(d).

Figure 11:
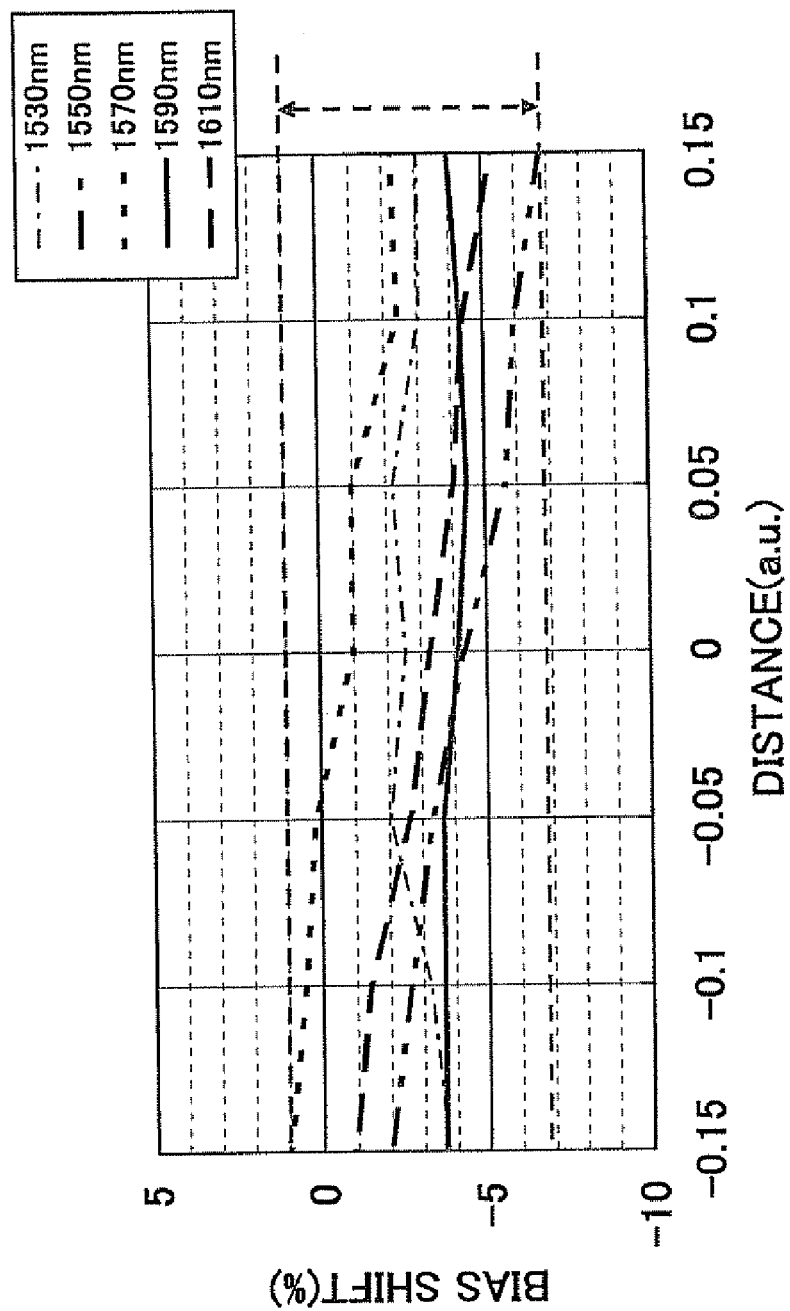
FIG. 11 is a diagram illustrating the variation amount of the bias shift with respect to the signal light wavelength according to a configuration in FIG. 20.
Figure 12:
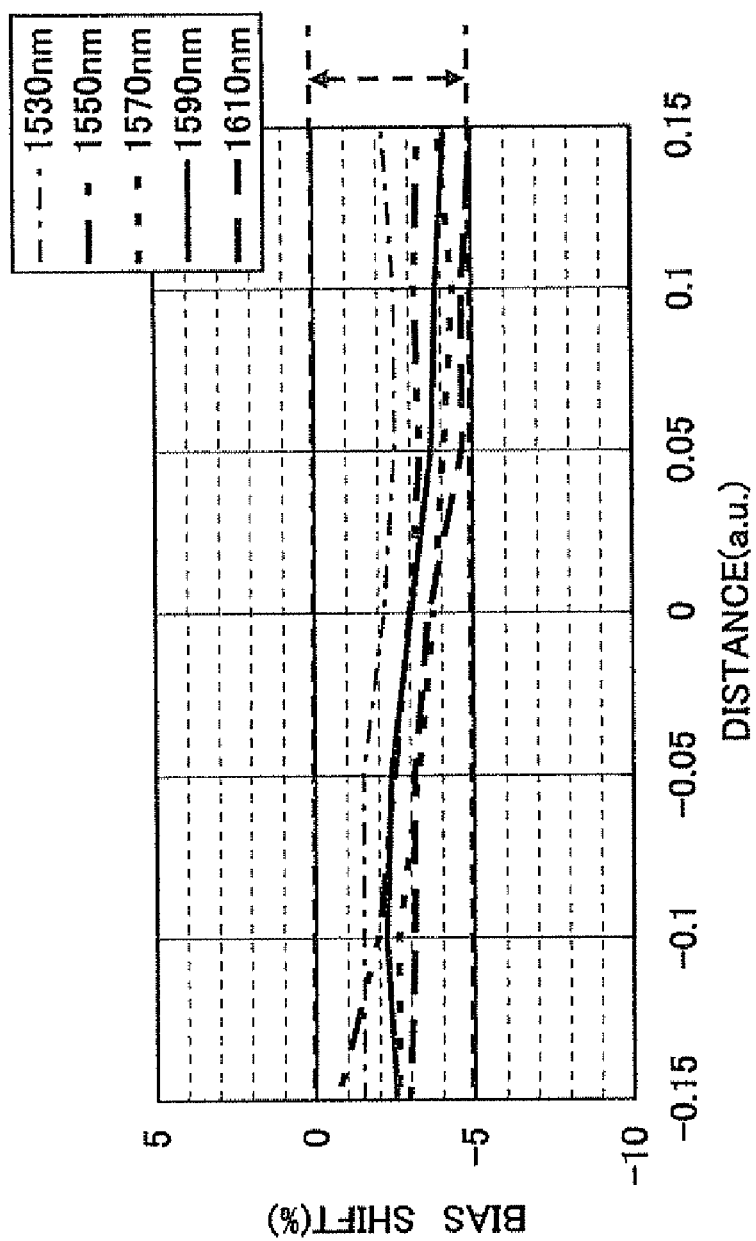
FIG. 12 is a view illustrating the variation amount of the bias shift with respect to the signal light wavelength in the configuration of the optical modulator according to the second embodiment.

FIGS. 11 and 12 are views illustrating the variation amount of the bias shift according to the center position of the light reception face of the photodiode which forms the light reception section. Particularly, FIG. 11 illustrates the variation amount in the configuration in FIG. 20, and FIG. 12 illustrates the variation amount in the configuration of the optical modulator according to the second embodiment. In the optical modulator 40 according to second embodiment, as shown in FIG. 12, also the dispersion of the variation amount depending upon the signal light wavelength can be suppressed in comparison with that of the characteristic (refer to FIG. 11) of the variation amount according to the signal light wavelength regarding the configuration shown FIG. 20.

In this manner, with the optical modulator 40 as the optical device according to the second embodiment, there is an advantage that, since higher-order mode light and 0th-order mode light are separated from each other by the reduced width region 42a, the phase deviation between the monitor light and the main signal light can be suppressed.

[b1] First Modification to the Second Embodiment

Figure 13:
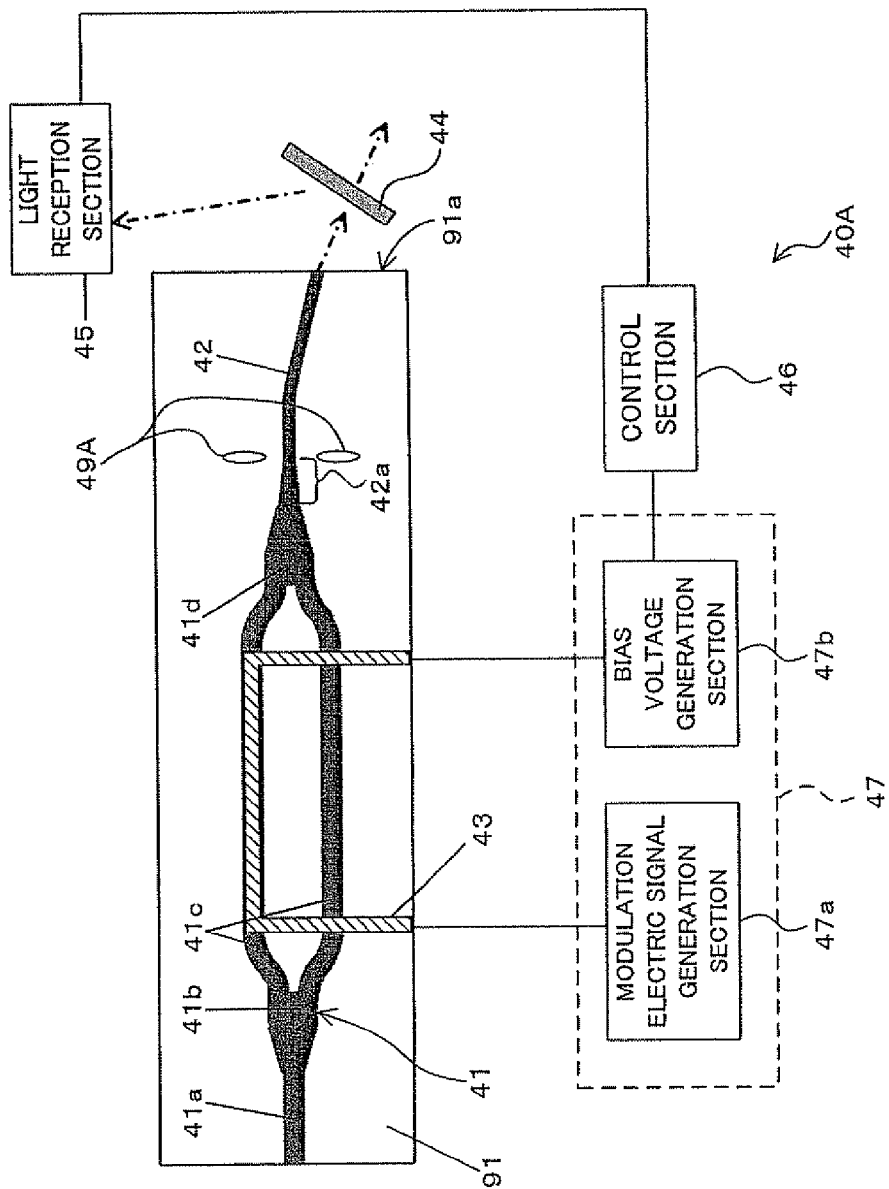
FIG. 13 is a view showing an optical modulator as an optical device according to a first modification to the second embodiment of the present invention.

FIG. 13 is a view showing an optical modulator 40A as an optical device according to a first modification to the second embodiment. As shown in FIG. 13, grooves 49A may be formed in the proximity of the opposite sides of the output optical waveguide 42 on the downstream side of the reduced width region 42a. Thus, higher-order mode light emitted to the opposite sides of the output optical waveguide 42 is reflected by the grooves 49A. Thus, the higher-order mode light emitted from the reduced width region 42a is blocked from being outputted from the outgoing end face 91a by the grooves 49A, and consequently, light reception by the light reception section 45 through branching by the half mirror 44 can be prevented further positively. As a result, it can be expected to further reduce the bias shift amount included in the electric signal in the light reception section 45 in comparison with that in the case of FIG. 9.

Accordingly, the grooves 49A described above serve as light blocking grooves formed in substrate regions on the opposite sides of the output optical waveguide at the downstream side position in the light propagation direction with respect to the reduced width region 42a for preventing light (higher-order mode light) propagated in the substrate region on the opposite sides of the output optical waveguide 42 from coming to the outgoing end face 91a.

Figure 14:
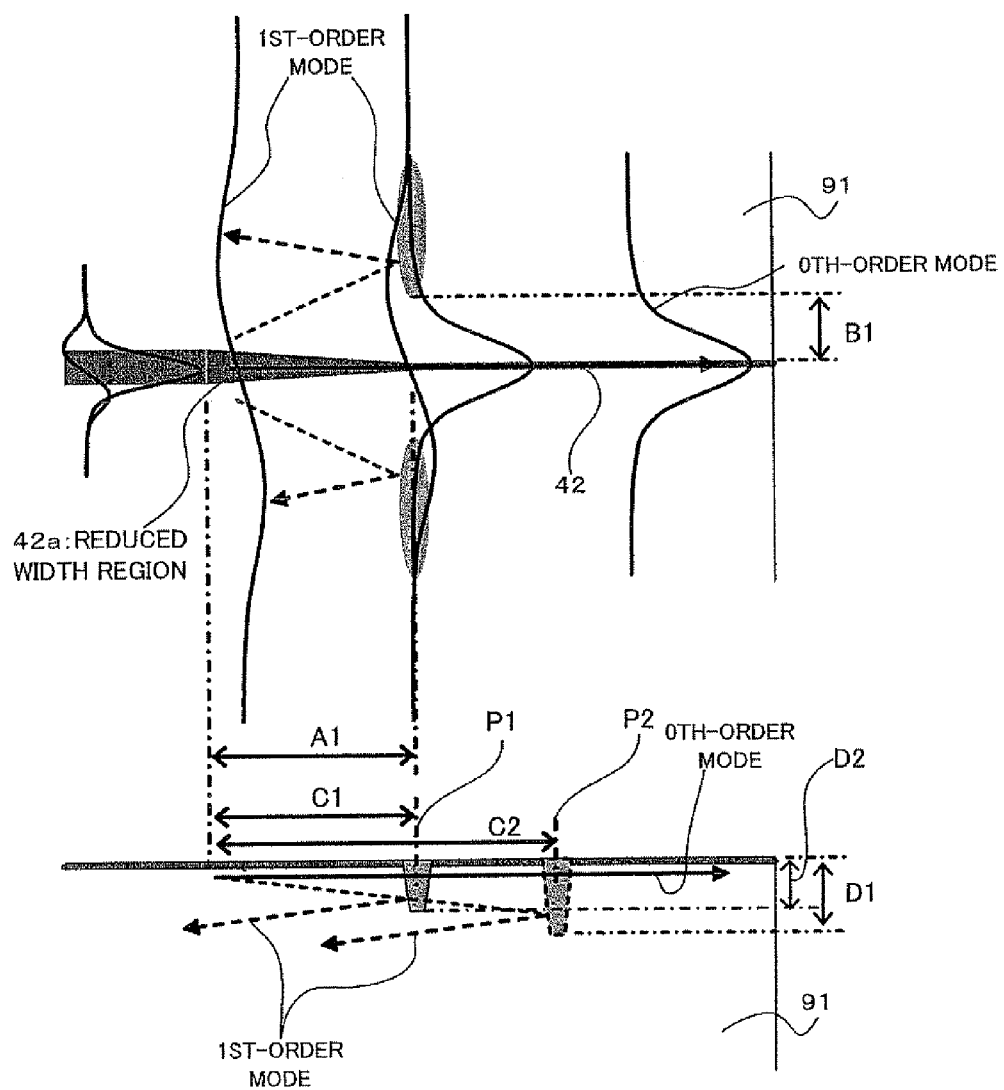
FIG. 14 is a diagrammatic illustrating a working-effect of the optical modulator as the optical device according to the first modification to the second embodiment.

FIG. 14 is a schematic view illustrating separation of first-order mode light and prevention of outgoing on the outgoing end face 91a in the case wherein the reduced width region 42a and the grooves 49A are provided as seen in FIG. 13. As seen in FIG. 14, in the reduced width region 42a of a length A1, first-order mode light from within modulated light from the MMI 41d is radiated to an outer peripheral portion (not only the outer layer portion of the substrate 91 but also in the depthwise direction) of the output optical waveguide 42. Meanwhile, 0th-order mode light is propagated in a state wherein a peak of the field distribution is maintained on the axis of the output optical waveguide 42. The 0th-order mode light and first-order mode light can be separated from each other in this manner. It is to be noted that 0th-order mode light and first-order mode light are separated from each other similarly also in the configuration in FIG. 9.

Further, since the first-order mode light radiated in the reduced width region to the outer peripheral portion of the output optical waveguide 42 is reflected by the grooves 49A formed on the downstream side of the reduced width region 42a as shown in FIG. 14, propagation of the first-order mode light to the downstream side in the light propagation direction with respect to the position at which the grooves 49A are formed, that is, mixing of the first-order mode light into the 0th-order mode light, is suppressed.

Further, since the separation effect of the first-order mode light appears over the full length in the longitudinal direction of the reduced width region 42a, it is necessary to set the formation position of the grooves 49A to the downstream side of the reduced width region 42a. Therefore, since the separated first-order mode light is radiated also in the depthwise direction, the grooves 49A are formed at a position as near as possible to the termination position of the reduced width region 42a on the downstream side of the reduced width region 42a. For example, the grooves 49A are formed at a position P1 displaced by a distance C1(=A1>C2) on the downstream side from a starting end position of the reduced width region 42a with respect to a position P2 displaced by a distance C2 on the downstream side from the starting end position as seen in FIG. 14.

Consequently, where the grooves 49A are formed at the position P1 nearer along the light propagation direction to the termination position of the reduced width region 42a rather than at the position P2 spaced away from the termination position of the reduced width region 42a, the radiated light can be efficiently reflected at a comparatively shallow position (groove depth D1 at the position P2>groove depth D2 at the position P1). Further, it is preferable to form the grooves 49A such that the distance (B1) between the grooves 49A and the output optical waveguide 42 is reduced as much as possible to enhance the reflection effect of the radiated light.

Figure 15A:
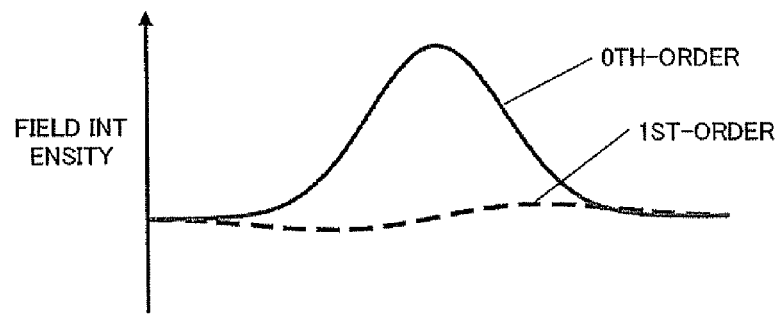
FIGS. 15(a) to 15(d) are diagrams illustrating a reduction effect of the bias shift by the optical modulator shown in FIG. 13.
Figure 15B:
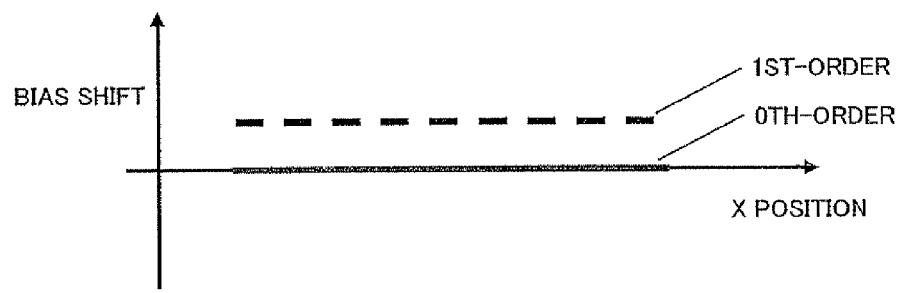
Figure 15C:
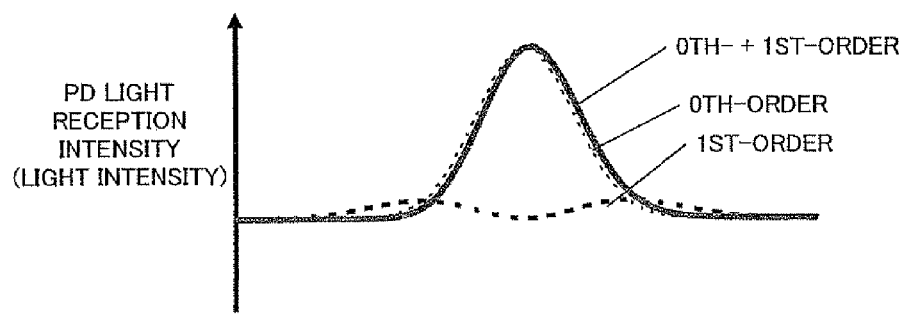
Figure 15D:
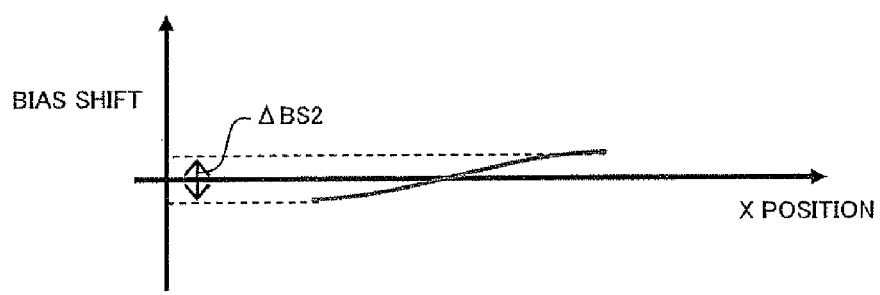

FIGS. 15(a) to 15(d) are views illustrating a bias shift reduction effect by the optical modulator 40A shown in FIG. 13. As seen from FIG. 15(a), the distribution of the field strength of first-order mode light with respect to the end position of the outgoing end face 91a (refer to FIG. 9) is further reduced in comparison with that in the case of the configuration of FIG. 9 (refer to FIG. 10(a)). Accordingly, even if first-order mode light has a phase variation amount component as seen in FIG. 15(b), since the first-order mode light component to be received by the photodiode serving as the light reception section 45 is reduced from that illustrated in FIG. 10(c) as seen in FIG. 15(c), the variation amount ΔBS2 of the bias shift at the center position of the light reception face of the photodiode serving as the light reception section 45 can be further suppressed in comparison with that in the case of FIG. 10(d) as seen from FIG. 15(d).

[b2] Second Modification to the Second Embodiment

Figure 16:
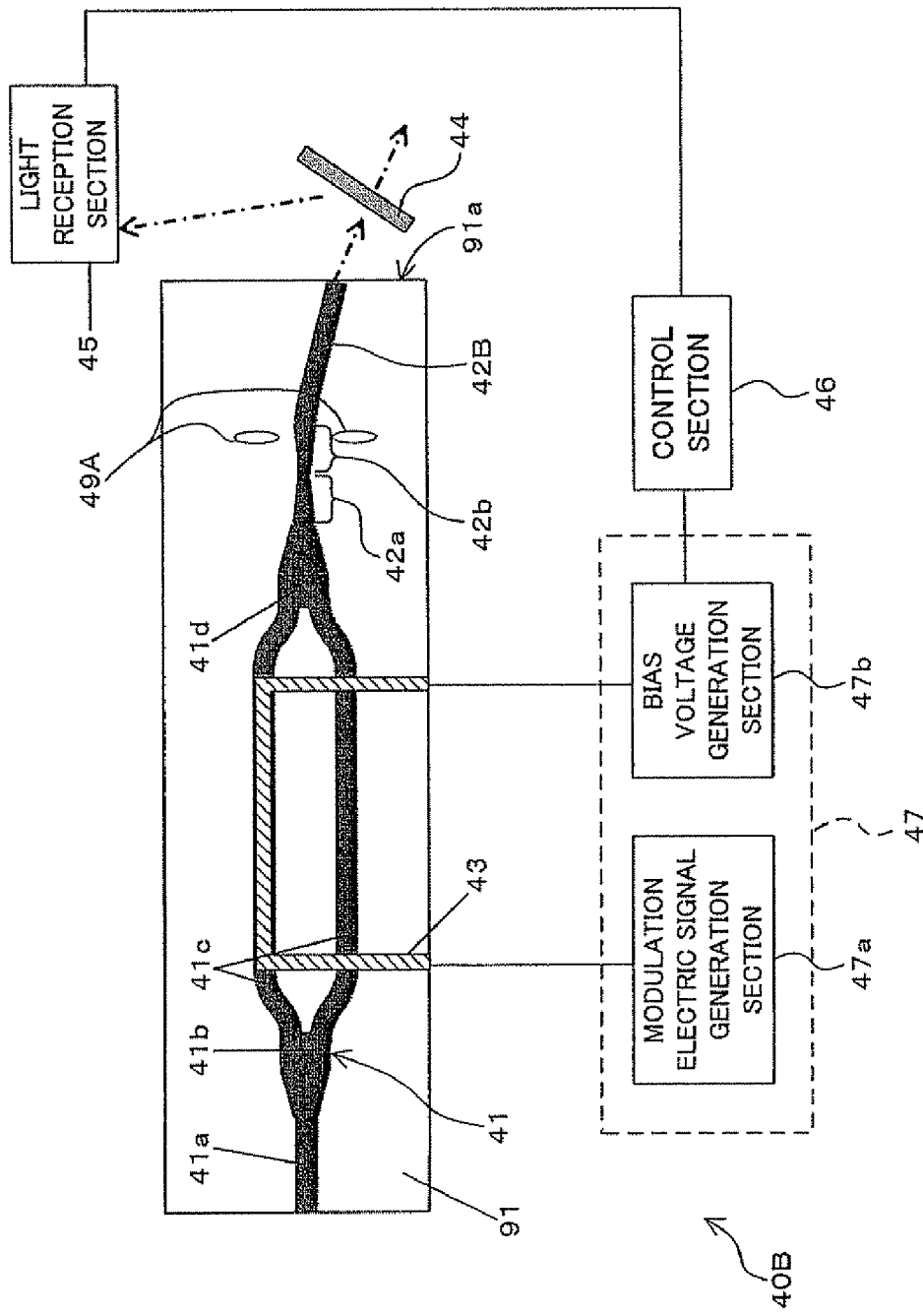
FIG. 16 is a view showing an optical modulator as an optical device according to a second modification to the second embodiment of the present invention.

FIG. 16 is a view showing an optical modulator 40B as an optical device according to a second modification to the second embodiment. Where the configurations shown in FIGS. 9 and 13 are employed, since the mode field is widened, 0th-order mode light which propagates along the output optical waveguide 42 whose waveguide width is reduced at the reduced width region 42a may possibly be radiated during propagation thereof up to the outgoing end face 91a, resulting in occurrence of insertion loss.

Further, in the configuration of FIG. 13, while the grooves 49A formed on the opposite sides of the output optical waveguide 42 are formed so as to be positioned in the proximity of the output optical waveguide 42 so that higher-order mode light may not leak to the emerging end face 91a side (refer to B1 of FIG. 14), 0th-order mode light where the mode field is expanded in this manner suffers from increase of the loss caused by reflection by the grooves 49A. On the other hand, if the grooves 49A are formed at a position sufficiently spaced away (refer to B1 of FIG. 14) from the output optical waveguide 42 so that the loss caused by reflection of 0th-order mode light whose mode field is expanded is reduced, then leakage of higher-order mode light increases, which gives rise to increase of the bias shift to be suppressed.

Figure 17:
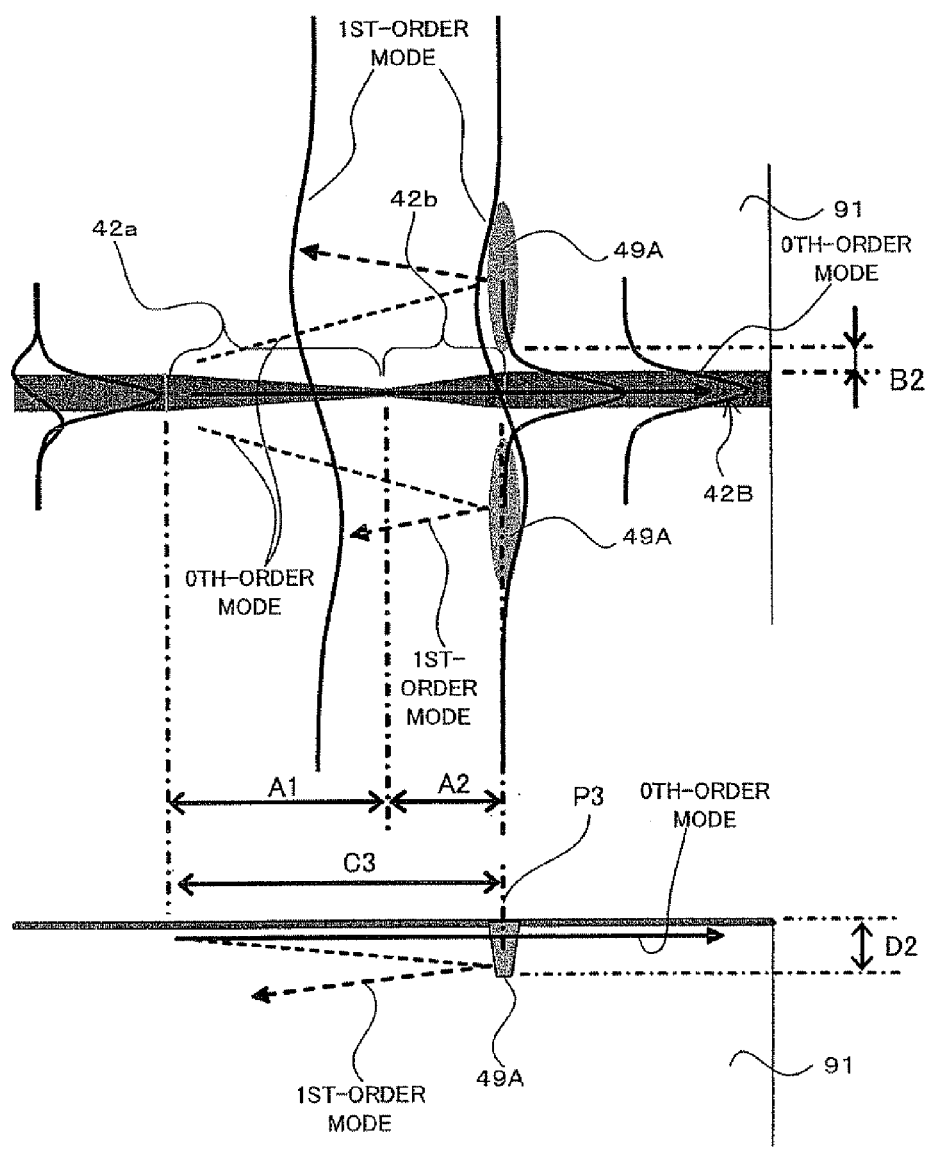
FIG. 17 is a diagrammatic view illustrating a working-effect of the optical modulator as the optical device according to the second modification to the second embodiment.

In the second modification to the second embodiment, in order to reduce the loss of 0th-order mode light, an output waveguide 42B includes an increased width region 42b on the downstream side with respect to the reduced width region 42a as seen in FIGS. 16 and 17. In particular, the increased width region 42b increases the waveguide width reduced by the reduced width region 42a to the original waveguide width on the downstream side in the light propagation direction with respect to the reduced width region 42a of the length A1.

Consequently, while higher-order mode light is radiated in the reduced width region 42a, the mode field of 0th-order mode light expands. However, since the width of the mode field of the 0th-order mode light can be returned to the original width by the increased width region 42b positioned next to the reduced width region 42a, the loss of the 0th-order mode light can be reduced while the 0th-order mode light and the higher-order mode light are separated from each other.

It is to be noted that it is necessary to set the position of the grooves 49A in this instance to the downstream side with respect to the increased width region 42b in order to minimize the leakage of 0th-order mode light and higher-order mode light. As described hereinabove, first-order mode light separated by the reduced width region 42a is radiated also in the depthwise direction. Accordingly, where the grooves 49A are formed at a position as near as possible to the termination position of the increased width region 42b on the downstream side with respect to the increased width region 42b (that is, at the position P3 on the downstream side spaced by a distance C3 from the starting end of the reduced width region 42a), then radiation light can be reflected by the shallow grooves 49A (depth D2) more efficiently than where the grooves 49A are formed on the downstream side with respect to the position P3. Consequently, the substrate strength can be maintained regardless of formation of the grooves 49A.

Accordingly, the grooves 49A are light blocking grooves formed in regions of the substrate 91 on the opposite sides of the output optical waveguide 42 at a position on the downstream side in the light propagation direction with respect to the increased width region 42b for blocking light (higher-order mode light), which propagates in the regions of the substrate 91 on the opposite sides of the output optical waveguide 42, from coming to the outgoing end face of the substrate 91.

It is to be noted that, since the mode field of 0th-order mode light is narrowed by the increased width region 42b, the distance (refer to B2 of FIG. 17) between the waveguide and the grooves 49A can be reduced in comparison with that in the configuration (refer to B1 of FIG. 14) of FIG. 12 (B2<B1).

Further, in order to form the shallow grooves 49A at a position near to the reduced width region 42a to achieve efficient reflection of radiation light by the grooves 49A as described above, the length A2 of the increased width region 42b is set as small as possible (can be made at least shorter than the length A1 of the reduced width region 42a) within a range within which the loss by a variation of the mode field may not be caused by sudden width increase.

Since the optical modulator 40B according to the second modification to the second embodiment is configured in such a manner as described above, 0th-order mode light and first-order mode light are separated from each other by the reduced width region 42a of the output waveguide 42B, and the expanded mode field of the 0th-order mode light is returned to the original one by the increased width region 42b thereby to reduce the loss. Further, higher-order mode light separated by the reduced width region 42a can be blocked from being emitted from the outgoing end face 91a as a result of reflection. Therefore, even where compared with the configurations described hereinabove with reference to FIGS. 9 and 13, there is an advantage that the bias shift can be further reduced and the loss of 0th-order mode light can be reduced.

Figure 18:
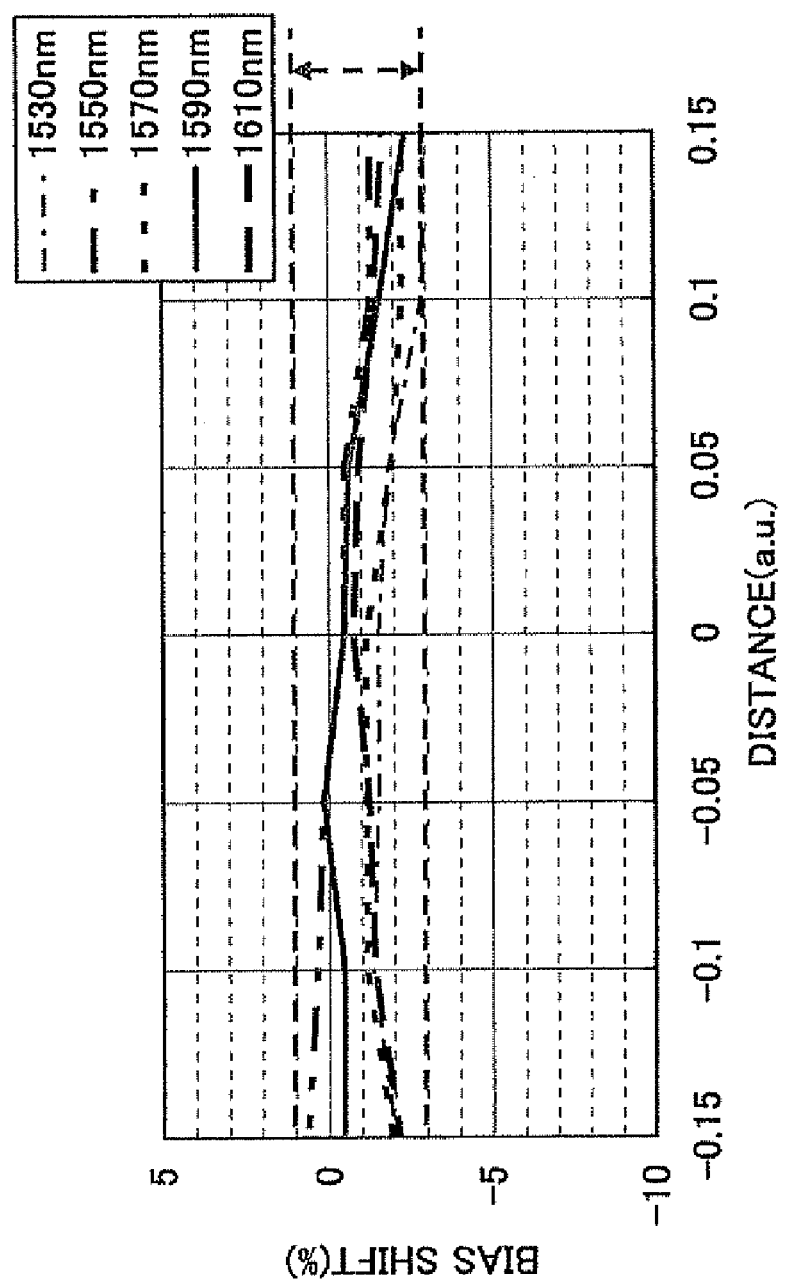
FIG. 18 is a view showing the variation amount of the bias shift with respect to the signal light wavelength in the configuration of the optical modulator according to the second modification to the second embodiment.

FIG. 18 illustrates the variation amount of the bias shift of different signal light wavelengths according to the center position of the light reception face of the photodiode serving as the light reception section where the optical modulator configuration shown in FIG. 13 is employed. In the optical modulator 40A shown in FIG. 13, also the dispersion of the variation amount depending upon the signal light wavelength can be further suppressed when compared with that of the characteristic (refer to FIG. 12) of the optical modulator 40 shown in FIG. 9 as seen from FIG. 18.

Accordingly, with the optical modulator 40B according to the second modification to the second embodiment, since higher-order mode light and 0th-order mode light are separated from each other by the reduced width region 42a and the separated higher-order mode light is reflected by the grooves 49A, there is an advantage that the phase deviation between monitor light and main signal light can be further suppressed.

Figure 19:
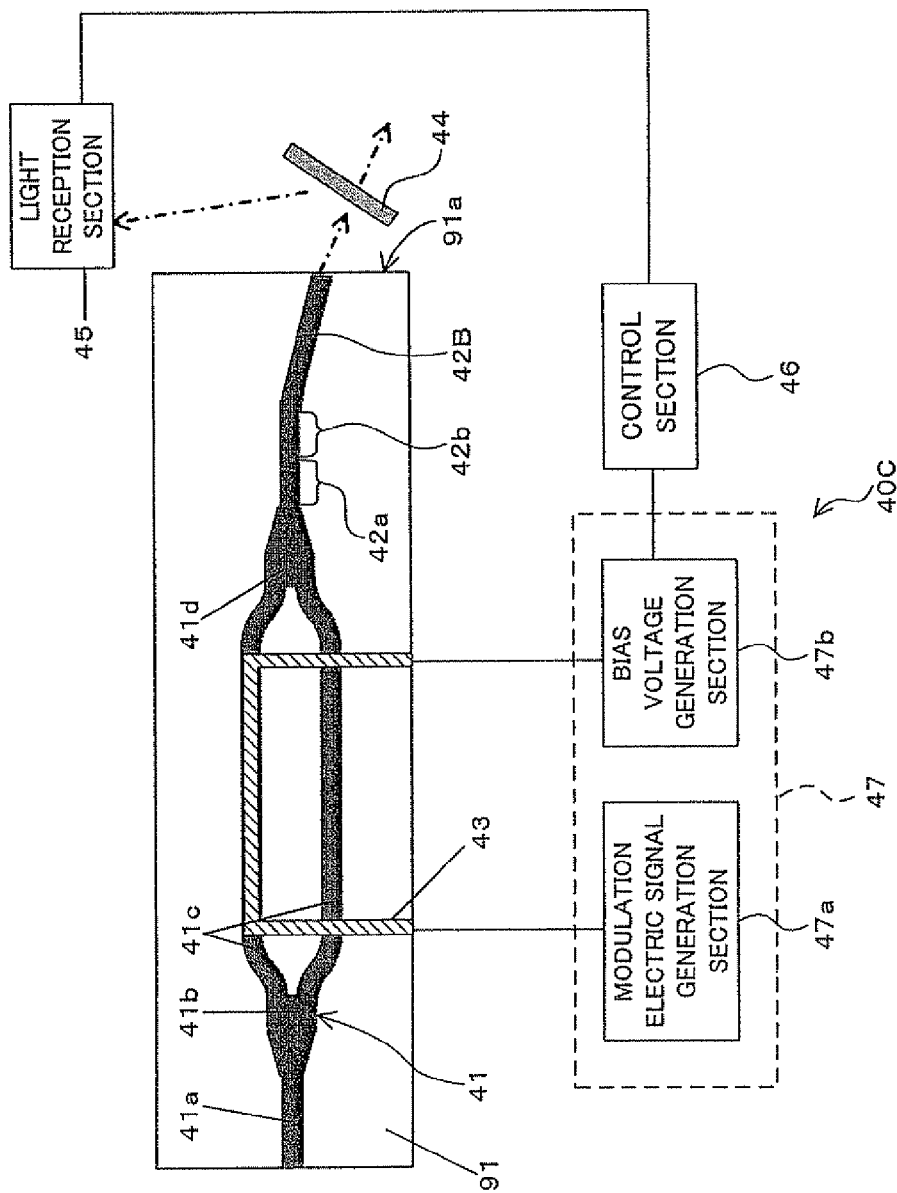
FIG. 19 is a view showing an optical modulator as an optical device according to a third modification to the second embodiment of the present invention.

It is to be noted that, while the optical modulator 40B described above is configured such that it has the grooves 49A formed thereon, even if it is otherwise configured such that it does not have the grooves 49A formed thereon, for example, like an optical modulator 40C shown in FIG. 19, at least 0th-order mode light and first-order mode light can be separated from each other by the reduced width region 42a of the output waveguide 42B. Therefore, the bias shift can be reduced from that of the conventional configuration shown in FIG. 20 while the loss can be reduced by returning the expanded mode field of the 0th-order mode light to the original mode field by means of the increased width region 42b.

[c] Others

The present invention can be carried out by modifying the embodiments described above in various manners without departing from the spirit and scope of the present invention.

Figure 8:
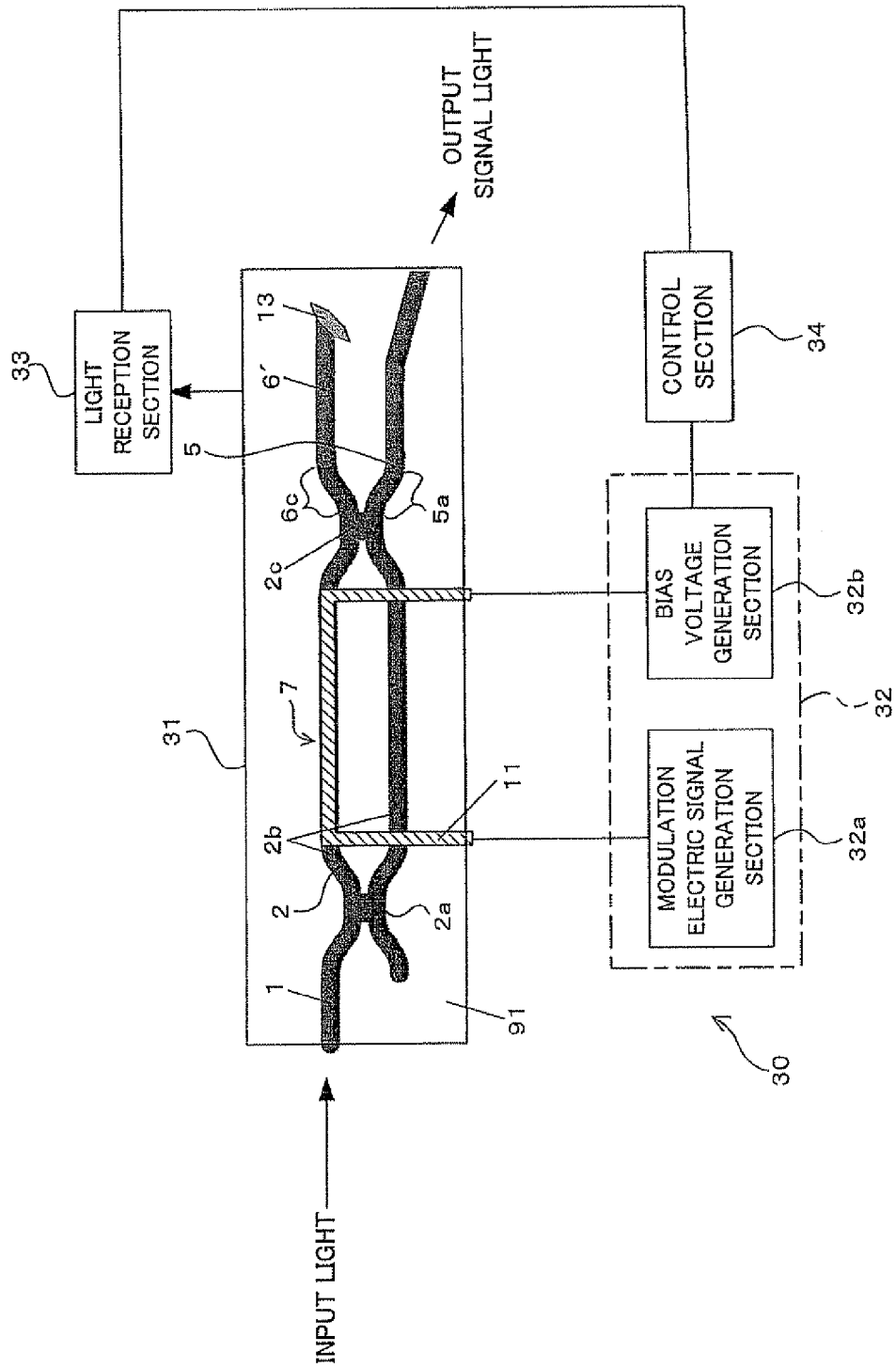
FIG. 8 is a view showing an optical device according to a modification to the first embodiment.

In particular while the monitoring optical waveguide 6 in the first embodiment described hereinabove includes the reduced width region 6a while the reflection groove 13 is formed, even if the configuration of the monitoring optical waveguide 6' which does not include the reduced width region 6a, for example, as seen in FIG. 3(a) or 8 is employed, it is possible to positively reflect 0th-order mode light, whose component which is confined in and transmitted along the monitoring optical waveguide 6' is reflected by a comparatively great amount, toward the light reception section 33 but exclude the reflection of higher-order mode light by a greater amount than that of the 0th-order mode light by employing the configuration that the width of the reflecting face of the reflection groove 13 corresponds to the waveguide width of the monitoring optical waveguide 6'. Therefore, the bias shift can be suppressed by a greater amount than that of the prior art. In particular, for example, where the monitoring optical waveguide 6' which does not have the reduced width region 6a is used and the width thereof is set to 7 µm, if the size C1 of the reflecting face to be formed on the reflection groove 13 is set so as to have a length of approximately 15 µm while the reflection groove 13 is formed in an inclined relationship by 45 degrees with respect to the waveguide advancing direction. Or, it is possible to form the monitoring optical waveguide 6' in such a shape that abeam of reflected light is included in the light receiving face of the photodiode which forms the light reception section 33 within the width range (refer to A in the case of FIG. 2) while, on the outer side (refer to B in the case of FIG. 2) of the width range A of the monitoring optical waveguide 6', the reflected light is directed in a direction diverted from the light reception section 33. Further, also where the monitoring optical waveguide 6' which does not include the reduced width region 6a is employed, in order to prevent a bias shift from being caused by a deviation of the phase variation of outgoing light which arises from mixing of the 0th-order light and first-order light in the process of light propagation along the waveguides 5 and 6', it is important to configure a bent region 6c of the monitoring optical waveguide 6 such that a region including a portion of the bent region 6c connected to the modulating optical waveguide 7 on the upstream side in the light propagation direction with respect to the reflection groove 13 is bent at an angle corresponding to the bent angle of the bent region 5a.

In particular, the output optical waveguide 5 is configured such that, as seen in FIG. 8, it includes the first bent region 5a having a shape in which it is bent at a predetermined bent angle from a portion at which the output optical waveguide 5 is connected to the modulating waveguide 7 and the monitoring optical waveguide 6' is configured such that it includes the second bent region 6c by which the region including the portion at which the monitoring optical waveguide 6' is connected to the modulating waveguide 7 is bent at an angle corresponding to the bent angle of the bent region 5a on the upstream side in the light propagation direction with respect to the reflection groove 13.

Further, while, in the embodiments described hereinabove, the pattern of the bent region 5a of the output optical waveguide 5 and the second bent region of the monitoring optical waveguide 6 is formed such that they may be line-symmetrical with respect to the axis in the light propagation direction, according to the present invention, the waveguide pattern is not limited to such a line-symmetrical waveguide pattern as described above only if mixing conditions between 0th-order mode light components and first-order mode light components of light propagating along the output optical waveguides 5 and 6 are substantially equal to each other.

Further, in the first embodiment described hereinabove, the arrangement position of the photodiode serving as the light reception section 33 is not limited particularly, but the photodiode may be disposed in contact with a side face of the substrate 91 or in a spaced relationship from a side face of the substrate 91.

Further, the devices of the present invention can be fabricated based on the disclosure of the embodiments described hereinabove.

What is claimed is:

1. The optical device, comprising:
   a substrate having an electro-optic effect;
   a modulating optical waveguide formed on a surface layer portion of said substrate and forming an interference optical modulator for modulating input light;
   an output optical waveguide formed on said surface layer portion of said substrate and connected to a downstream side portion of said modulating optical waveguide; and
   a branching monitoring section for monitoring branched light of light propagated along said output optical waveguide and emitted from an outgoing end face of said substrate, wherein
   said output waveguide has a reduced width region in which the waveguide width is reduced, and
   said output optical waveguide has, on the downstream side in a light propagation direction with respect to said reduced width region, an increased width region in which the waveguide width reduced in said reduced width region is increased to the original waveguide width.

2. The optical device as claimed in claim 1, wherein a pair of light blocking grooves for blocking the light propagated along regions of said substrate on the opposite sides of said output optical waveguide from reaching said outgoing end face are formed in the substrate regions on the opposite sides of said output optical waveguide at a position on the downstream side in the light propagation direction with respect to said reduced width region.

3. The optical device as claimed in claim 1, wherein said modulating optical waveguide includes an input waveguide for guiding the input light and a branching and coupling waveguide connected to the downstream side of said input waveguide for branching the input waveguide to a plurality of waveguides and coupling the branched waveguides, and said output optical waveguide is connected to a portion of said branching and coupling waveguide on the downstream side with respect to the coupled portion.

4. The optical device as claimed in claim 1, further comprising:
   an electrode for applying an optical modulation voltage to the light propagated along said modulating optical waveguide;
   a voltage signal generation section for generating a voltage signal to be applied to said electrode; and
   said branching monitoring section including a branching portion for branching light emitted from said outgoing end face and a light reception portion for receiving the light branched by said branching section as monitoring light;
   a control section for controlling the voltage signal to be generated by said voltage signal generation section based on a result of the monitoring of the light received by said light reception section.

5. The optical device, comprising:
   a substrate having an electro-optic effect;
   a modulating optical waveguide formed on a surface layer portion of said substrate and forming an interference optical modulator for modulating input light;
   an output optical waveguide formed on said surface layer portion of said substrate and connected to a downstream side portion of said modulating optical waveguide; and
   a branching monitoring section for monitoring branched light of light propagated along said output optical waveguide and emitted from an outgoing end face of said substrate, wherein
   said output waveguide has a reduced width region in which the waveguide width is reduced, and
   a pair of light blocking grooves for blocking the light propagated along regions of said substrate on the opposite sides of said output optical waveguide from reaching the outgoing end face are formed in the substrate regions on the opposite sides of said output optical waveguide at a position on the downstream side in the light propagation direction with respect to said reduced width region.

6. The optical device as claimed in claim 5, wherein said modulating optical waveguide includes an input waveguide for guiding the input light and a branching and coupling waveguide connected to the downstream side of said input waveguide for branching the input waveguide to a plurality of waveguides and coupling the branched waveguides, and said output optical waveguide is connected to a portion of said branching and coupling waveguide on the downstream side with respect to the coupled portion.

7. The optical device as claimed in claim 5, further comprising:

an electrode for applying an optical modulation voltage to the light propagated along said modulating optical waveguide;

a voltage signal generation section for generating a voltage signal to be applied to said electrode; and said branching monitoring section including a branching portion for branching light emitted from said outgoing end face and a light reception portion for receiving the light branched by said branching section as monitoring light;

a control section for controlling the voltage signal to be generated by said voltage signal generation section based on a result of the monitoring of the light received by said light reception section.

* * * * *

UNITED STATES PATENT AND TRADEMARK OFFICE
CERTIFICATE OF CORRECTION

PATENT NO. : 7,689,078 B2
APPLICATION NO. : 12/035720
DATED : March 30, 2010
INVENTOR(S) : Akira Ishii et al.

It is certified that error appears in the above-identified patent and that said Letters Patent is hereby corrected as shown below:

Column 23, Line 63, change "The optical device," to --An optical device,--.

Column 24, Line 50, change "The optical device," to --An optical device,--.

Signed and Sealed this

Twenty-second Day of June, 2010

David J. Kappos
*Director of the United States Patent and Trademark Office*